United States Patent [19]

Kuwana et al.

[11] 3,934,938
[45] Jan. 27, 1976

[54] METHOD, CIRCUIT, AND APPARATUS FOR ANTI-SKID BRAKE CONTROL IN MOTOR VEHICLES

[75] Inventors: Kazutaka Kuwana, Toyota; Hiroyuki Amano, Chiryu, both of Japan

[73] Assignee: Aisin Seiki Kabushiki Kaisha, Japan

[22] Filed: July 17, 1973

[21] Appl. No.: 380,096

[30] Foreign Application Priority Data
July 20, 1972   Japan................................ 47-72722
Sept. 28, 1972  Japan................................ 47-97419
Sept. 28, 1972  Japan................................ 47-97420

[52] U.S. Cl................ 303/21 P; 235/150.2; 303/20; 317/5
[51] Int. Cl.².......................................... B60T 8/10
[58] Field of Search............... 188/181; 303/20, 21; 317/5; 324/161–162; 340/52 R, 62, 262–263; 235/150.2

[56] References Cited
UNITED STATES PATENTS

| | | |
|---|---|---|
| 3,578,819 | 5/1971 | Atkins............................ 303/21 BE |
| 3,653,727 | 4/1972 | Kullberg et al..................... 303/21 P |
| 3,744,854 | 7/1973 | Odya et al........................ 303/21 P |
| 3,746,925 | 7/1973 | Schaepman............................ 317/5 |
| 3,756,662 | 9/1973 | Kuwana..................... 303/21 BE X |
| 3,758,166 | 9/1973 | Kuwana et al............. 303/21 BE X |
| 3,764,817 | 10/1973 | Nakamura et al.......... 303/21 BE X |

*Primary Examiner*—Trygve M. Blix
*Assistant Examiner*—Stephen G. Kunin
*Attorney, Agent, or Firm*—Stevens, Davis, Miller & Mosher

[57] ABSTRACT

Anti-skid brake control system in which the slip ratio of a wheel is calculated from a simulative vehicle speed which is obtained by simulatively detecting the vehicle speed and speed of a wheel to be controlled. Logic circuitry discriminates whether or not the slip ratio is within a predetermined slip range of 20–60% producing large adhesive coefficients. Hydraulic brake pressure is reduced in response to deceleration of the wheel and is increased in response to acceleration of the wheel when the slip ratio of the wheel is within the predetermined slip range.

2 Claims, 20 Drawing Figures

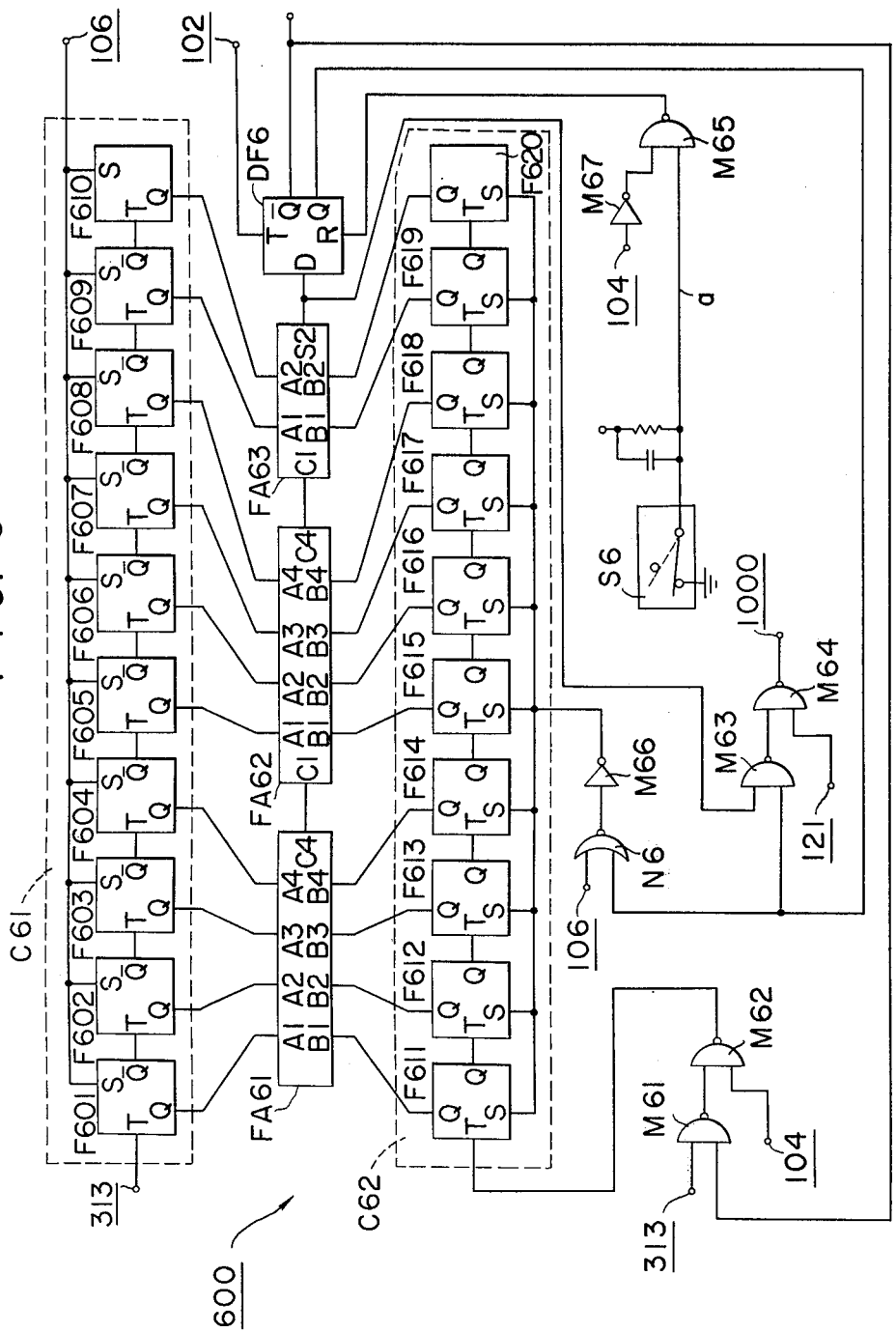
F I G. 6

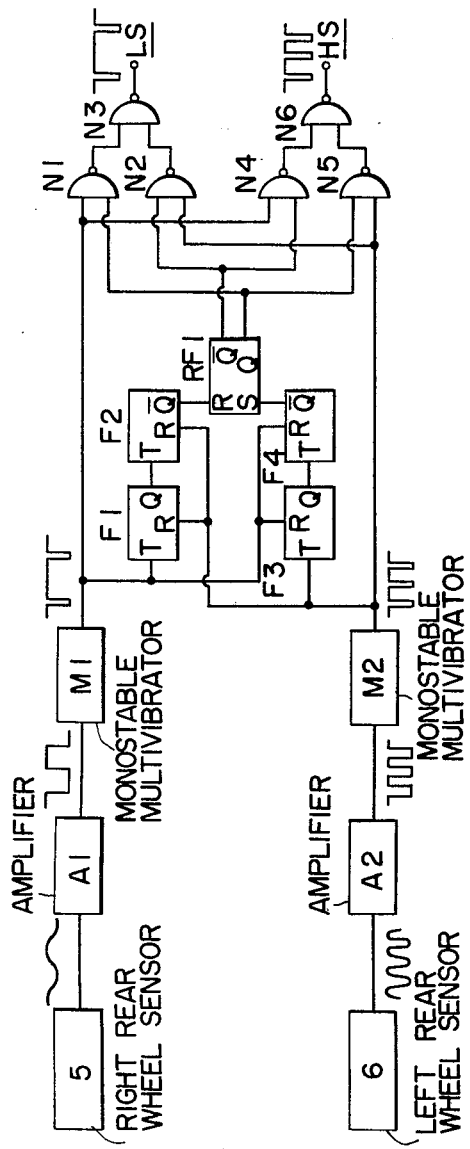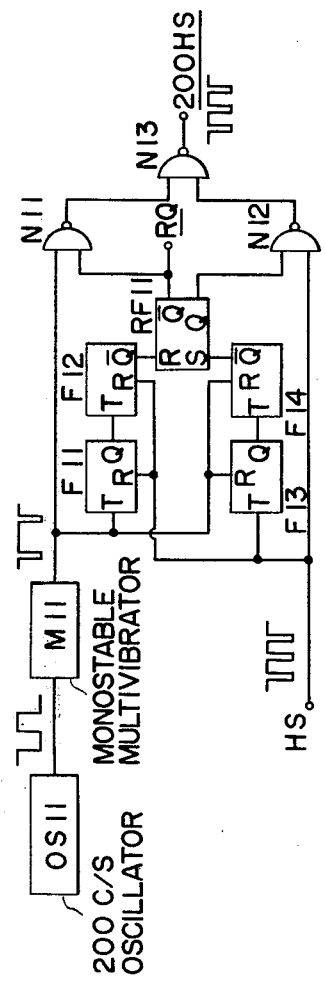
FIG. 12
FIG. 13

METHOD, CIRCUIT, AND APPARATUS FOR ANTI-SKID BRAKE CONTROL IN MOTOR VEHICLES

BACKGROUND OF THE INVENTION

This invention relates generally to brake control techniques in motor vehicles, and more particularly to a method for controlling the braking operation in accordance with an instantaneous vehicle speed relative to the ground so that the occurrence of "wheel lock" is prevented and any possibility of causing skidding is eliminated. The invention is further concerned with an electric circuit for simulating the vehicle speed relative to the ground and an apparatus for practicing the aforementioned method.

Heretofore, various methods and apparatuses have been proposed for controlling the braking force in automobiles thereby to prevent wheel lock and minimize braking distance.

In most of the conventional methods or apparatuses, the vehicle speed relative to the ground is first detected, and the braking force is so adjusted that the peripheral speeds of the wheels under braking are maintained at approximately 80% of the vehicle speed. Such a practice has been believed to be specifically advantageous when road conditions and other factors are taken into consideration.

Conventionally, the vehicle speed relative to the ground has been obtained in the manner described below. Trains of pulses representing rotating speeds of the wheels are produced by means of a plurality of sensors provided on the wheel axles of the vehicle; of these pulse trains, one representing the highest wheel speed is selected; and the pulse train thus selected is thereafter corrected so that a corrected signal simulating the vehicle speed relative to ground is obtained, this corrected signal being used for producing a deceleration corresponding to 1.2G. The vehicle speed relative to ground thus simulated will be hereinafter called the "simulated vehicle speed."

According to the conventional systems are described above, it has been difficult to obtain a "simulated vehicle speed" of sufficient accuracy and even when accurate "simulated vehicle speed" is obtained, accurate control of the braking force cannot be attained unless the relation between the slip (s) and the adhesive coefficient ($\mu$) of the road surface is taken into consideration.

SUMMARY OF THE INVENTION

Therefore, a primary object of the present invention is to provide an electric circuit for obtaining a sufficiently accurate simulated vehicle speed relative to ground.

Another object of the present invention is to provide a method and an apparatus therefore wherein the relation between the slip (s) of the wheels and the adhesion coefficient ($\mu$) of the road surface is taken into consideration, whereby the wheel lock phenomenon can be effectively prevented, and the braking distance can be minimized to an optimum value.

With the above objects and other objects of the present invention, according to the invention there are proposed an anti-skid control method for an automobile, said method comprising the steps of calculating the slip ratio of a wheel from a simulative vehicle speed obtained by simulatively detecting the vehicle speed and speed of a wheel to be controlled; and reducing the braking hydraulic pressure in response to deceleration of the wheel and to increasing said braking hydraulic pressure in response to acceleration of the wheel by means of comparing logical circuit means adapted to discriminate whether or not said slip ratio is within a predetermined slip range of 20–60% producing large adhesive coefficients, when said slip ratio of the wheel is within said predetermined slip range, and apparatuses and a simulative circuit for simulating speed of an automobile under braking, said apparatuses and circuit being adapted for embodying effectively said method.

BRIEF DESCRIPTION OF THE DRAWINGS

In the drawings:

FIG. 6 is a circuit diagram showing a pulse conversion circuit which constitutes still another part of the vehicle speed simulating circuit;

FIG. 12 is a circuit diagram showing a first selecting circuit used in the brake controlling device shown in FIG. 10;

FIG. 13 is a circuit diagram showing a second selecting circuit used in the brake controlling device shown in FIG. 10;

DETAILED DESCRIPTION OF THE INVENTION

As described hereinbefore, when it is desired to realize an efficient anti-skid brake control of an automobile, skillful utilization of the vehicle speed relative to the ground is a first important requisite, and provision of a circuit for producing a signal corresponding to correct simulation of the vehicle speed relative to the ground becomes a problem.

According to the present invention, there is provided a vehicle speed simulating circuit wherein the rotating speed of each wheel is detected as a frequency of a pulse signal having a specific waveform, the waveform is thereafter converted to another predetermined waveform thereby to simulate a vehicle speed relative to the ground in the course of a braking operation of an automobile, and the vehicle speed relative to the ground thus obtained is utilized in the anti-skid brake control of the automobile.

The vehicle speed simulating circuit will now be described in detail with reference to FIGS. 1 through 8.

Figure 1:
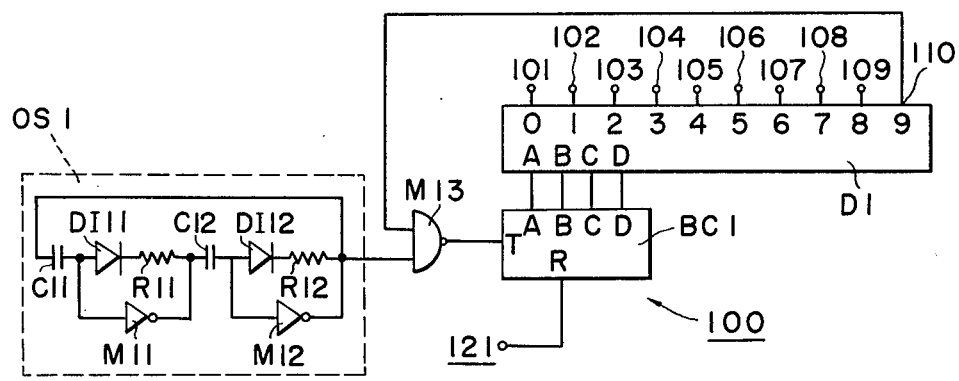
FIG. 1 is a circuit diagram showing a clock pulse generating circuit constituting one part of a vehicle speed simulating circuit according to the present invention in one aspect thereof.

Referring first to FIG. 1, there is indicated a timing pulse generating circuit 100 including an oscillation circuit OS1. The oscillation circuit OS1 comprises capacitors C11 and C12, diodes DI11 and DI12, resistors R11 and R12, inverters M11 and M12, and other components. The output from the oscillation circuit OS1 is supplied to an input terminal of a NAND element M13, and the output side thereof is connected to the input terminal T of a binary counter BC1. The output terminals A, B, C, and D of the binary counter BC1 are further connected to the imput terminals A, B, C, and D of a decoder D1, respectively. The decoder D1 has 10 output terminals among which an output terminal "9" is connected back to another input terminal of the aforesaid NAND element M13. An input terminal R of the binary counter BC1 is supplied with an input signal formed into a higher logic state H (hereinafter described H state) or a lower logic state L (hereinafter described L state) depending on the frequency proportional to the speed of a vehicle wheel having the highest rotating speed. The timing pulse generating circuit 100 operates as follows.

When an input signal 121 indicative of the highest rotating speed of the wheels is in the H state, the binary counter BC1 is reset. Thus, only the output 101 delivered from an output terminal "0" of the decoder D1 is brought into the L state, and all of the remaining outputs from terminals "1" through "9" assume the H state. For convenience in the description, the outputs of the decoder D1 are designated by the numerals 101 through 110 and these numerals are also used for indicating the inputs of the other circuits.

When the input signal 121 of the binary counter BC1 is transferred from H to L, the binary counter starts its counting operation. At this instant, the output 110 from the terminal "9" of the decoder D1 is maintained at H, the output from the NAND element M13 is equal to the output of the oscillation circuit OS1, but the polarity thereof is reversed.

Figure 2:
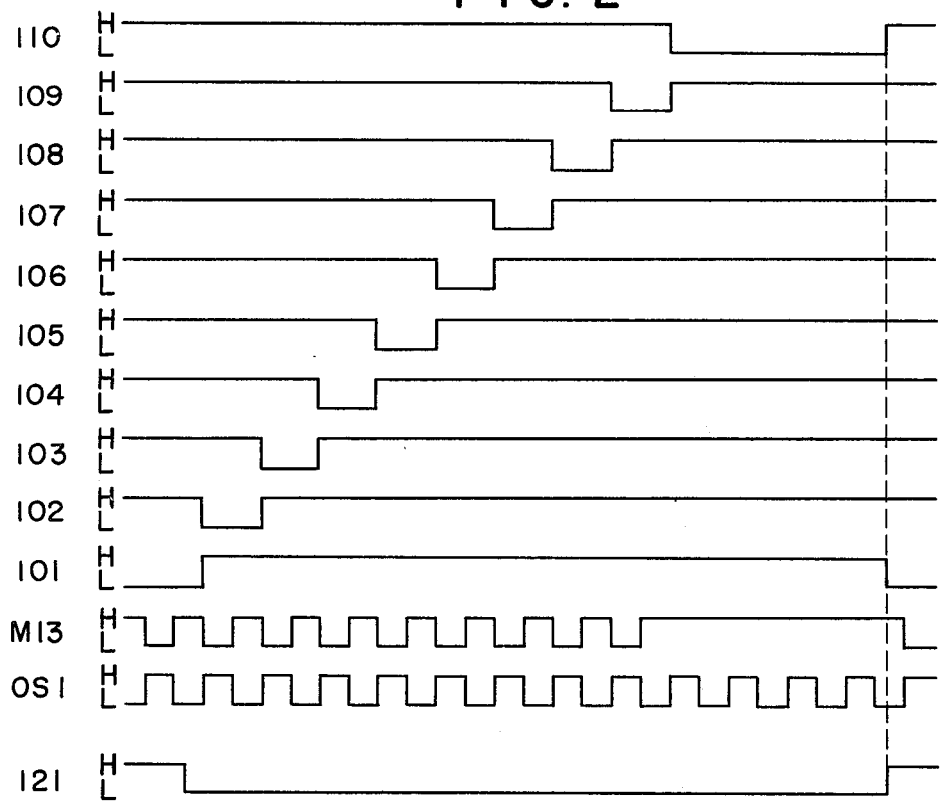
FIG. 2 is a waveform diagram showing waveforms at various parts of the circuit (100) of FIG. 1.

In FIG. 2, the relation between the two outputs is indicated. Upon starting of the counting operation of the binary counter BC1, the outputs of the decoder D1 are successively transferred from the H state to the L state as shown in FIG. 2, and the period during which each of the outputs is kept in the L state is equal to one cycle period of the clock pulse. Furthermore, the transfer from the H state to the L state of each output coincides with a falling instant into the L state of the output from the NAND element M13. Thus, when the output 110 from the terminal "9" becomes L, the output 110 enters one input terminal of the AND element M13, thus placing the output thereof in the H state.

As a result, the binary counter BC1 stops counting the output pulses from the NAND element M13, and the output 110 from the terminal "9" of the decoder D1 is maintained in the L state. As will be apparent from FIG. 2, the L state of the output 110 continues while the input 121 is in the L state, and when the input 121 is thereafter changed from the L state to the H state, the binary counter BC1 is reset to the original condition, and only the output 101 from the terminal "0" is brought into the L state, all of the remaining outputs 101 through 109 being brought into the H state. When the input 121 is again transferred from the H state to the L state, the above described operation is repeated.

Summarizing the above described cyclic operation of the timing pulse generating circuit 100, when the input signal indicative of the speed of the wheel rotating at the highest rotational speed among the wheels of an automobile is in the L state, the above described one cycle of operation is carried out, and the outputs from the decoder D1 are all maintained in the states obtained at the end of the one-cycle operation. In other words, the timing pulse generating circuit 100 does not proceed into the second cycle of operation as long as the L state of the input signal continues.

Figure 3:
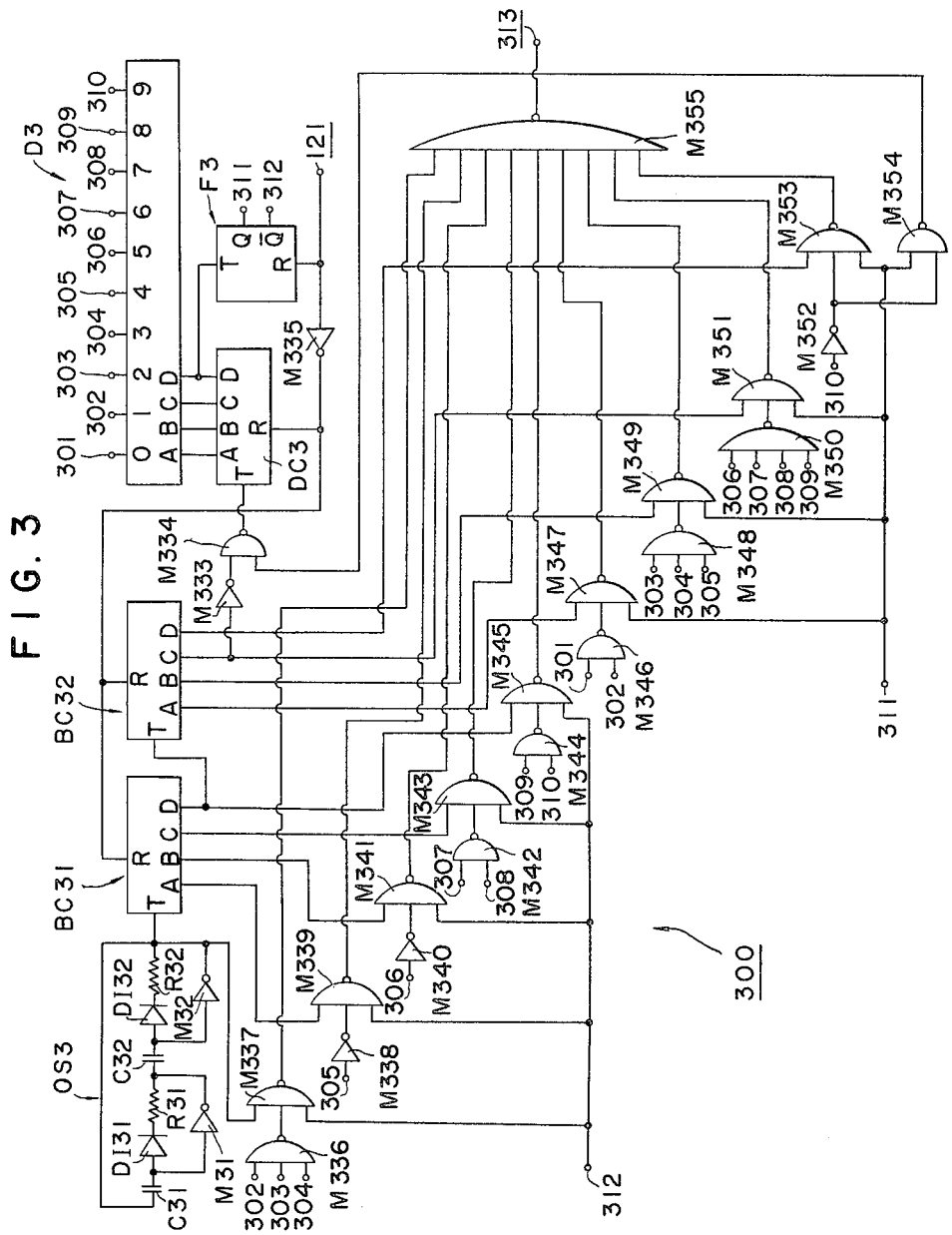
FIG. 3 is a circuit diagram showing a modulation frequency generating circuit constituting another part of the vehicle speed simulating circuit.

Referring now to FIG. 3, there is indicated a modulation frequency generating circuit 300 which comprises an oscillator OS3, two binary counters BC31 and BC32, a decade counter DC3, a decoder D3, and a flip-flop circuit F3. The oscillator OS3 is of a well known type comprising capacitors C31 and C32, diodes DI31 and DI32, resistors R31 and R32, inverters M31 and M32, and other components.

The output of the oscillator OS3 is connected to an input terminal T of the binary counter BC31 and also to an input terminal of a NAND element M337. Furthermore, the aforesaid input signal indicative of the highest rotational speed of the wheels is applied to an input terminal 121 indicated at the right upper part in FIG. 3. The input signal is connected to an input terminal R of the flip-flop F3 and also to an inverter M335 so that the polarity of the input signal is reversed. The output of the inverter M335 is introduced into an input terminal R of the decade counter DC3 and also input terminals R of the binary counters BC31 and BC32. The output D of the binary counter BC31 is connected to an input terminal T of the binary counter BC32, and an output terminal C of the binary counter BC32 is connected through an inverter M333 to an input side of a NAND element M334. The output terminal of the NAND elemenet M334 is connected to an input terminal T of the decade counter DC3, and the output terminals A, B, C, and D of the decade counter DC3 are respectively connected to input terminals A, B, C, and D of the decoder D3. The output terminal D of the decode counter DC3 is also connected to an input terminal T of the flip-flop F3.

The output terminals "0" through "9" of the decoder D3 are connected to input terminals of NAND elements having even reference numerals M336 through M352, which are disposed obliquely in FIG. 3. More specifically, three outputs 302, 303, and 304 obtained from the output terminals "1", "2", and "3" of the decoder D3 are connected to the corresponding input terminals of the NAND element M336, and likewise an output 305 obtained from the terminal "4" is supplied to an input of an inverter M338. In a similar manner, an output 306 from the terminal "5" is supplied to an inverter M340, outputs 307 and 308 obtained from the terminals "6" and "7" are supplied to a NAND element M342, and outputs 309 and 310 obtained from the terminals "8" and "9" are supplied to a NAND element M344. Furthermore, two outputs 301 and 302 obtained from the terminals "0" and "1" of the same decoder D3 are supplied to a NAND element M346, three outputs 303, 304, and 305 obtained from the terminals "2", "3", and "4" are supplied to a NAND element M348, four outputs 306, 307, 308, and 309 obtained from the terminals "5", "6", "7", and "8" are supplied to a NAND element M350, and an output 310 obtained from the terminal "9" is supplied to an inverter M352.

Outputs of the aforesaid NAND elements and inverters M336, M338, M340, M342, M344, M346, M348, M350, and M352 are supplied to an input terminal of NAND elements designated by odd reference numerals such as M337, M339, M341, M343, M345, M347, M349, M351, and M353, respectively. In addition to the abovementioned output signals, the output of the oscillator OS3 and outputs A, B, C, and D of the binary counters BC31 and BC32 are further supplied to the input terminals of the nine NAND elements respectively designated by odd reference numerals. Furthermore, to the input terminals of the NAND elements M337 through M345 within the NAND elements designated by odd reference numerals, an output 312 obtained from terminal $\overline{Q}$ of the flip-flop circuit F3 is supplied, and to the output terminals of the NAND elements M347 through M353, an output 311 obtained from the terminal Q of the same flip-flop circuit F3 is supplied. All of the outputs obtained from the NAND elements designated by odd reference numerals are supplied to input terminals of a NAND element M355.

In addition, a NAND element M354 indicated in the right lower part of FIG. 3 has input terminals connected with an output side of the inverter M352 and supplied with the output 311 obtained from the terminal Q of the flip-flop circuit F3, and the output of the NAND element M354 is supplied to an input terminal of a NAND element M334 indicated in the upper middle part of FIG. 3.

The operation of the modulation frequency generating circuit 300 will now be described. It is assumed that the output frequency of the oscillation circuit OS3 is 256 KC/S. When the input signal 121 indicative of the highest rotating speed of the wheels is in the lower frequency state L, the flip-flop circuit F3 is brought into the reset state and, furthermore, the binary counters BC31 and BC32, and the decade counter DC3, which are supplied directly or through the inverter M335 with the input signal 121, are all brought into a reset state. In this reset state, outputs A, B, C, and D of the decade counter DC3 are all in the low state L, and only the output 301 obtained from the "0" terminal of the decoder D3 is in the L state and all of the remaining outputs obtained from the terminals "1" through "9" of the same decoder D3 are brought into the H state. As a result, the outputs from all of the nine NAND elements and inverters designated by even reference numerals M336 through M352 are in the L state.

Accordingly, the outputs of all of the NAND elements designated by odd reference numerals M337 through M353, which receive the outputs in the L state of the abovementioned elements designated by the even reference numerals are all brought into the H state, and the output of the NAND element M355, which is receiving the outputs of all of the NAND elements M337 through M353 designated by the odd reference numerals, is brought into the L state. This means that when the input signal 121 is in the L state, the ultimate output signal 313 from the NAND element M355, said output signal corresponding to the last output of the modulation frequency generating circuit 300, is brought into the L state.

When the input signal 121 is then varied from the L state to the H state, the binary counters BC31 and BC32, decade counter DC3, and flip-flop F3 are all released from the reset state, and the decade counter DC3 starts the counting operation. Since the oscillation frequency of the oscillation circuit OS3 is 256 KC/s, the output A of the binary counter BC31 becomes 128 KC/S, and other outputs B, C, and D are brought to 64 KC/S, 32 KC/S, and 16 KC/S, respectively. Likewise, the outputs A, B, C, and D of the binary counter BC32 are made into pulses of 8 KC/S, 4 KC/S, 2 KC/S, and 1 KC/S, respectively.

At this instant, even if the input signal 121 is transferred from L to H, the output Q of the flip-flop F3 is maintained in the L state. That is, the output Q is left in the L state until the input signal T of the flip-flop circuit T3 is changed from H to L. Accordingly, the output of the NAND element M354 having an input side connected to the output side Q of the flip-flop F3 is maintained in the H state.

Thus, the NAND element M334 at the central part of FIG. 3 reverses the output signal obtained from the inverter M333, and the thus reversed signal is applied to an input terminal T of the decade counter DC3. At this instant, the decade counter DC3 which has been placed in an operable state starts to count the output C of the binary counter BC32. The inverter M333 is employed for providing a time interval between an instant when the input signal 121 has been changed from L to H and another instant when the NAND element M355 delivers an output of 256 KC/S. If the inverter M333 is not provided, the abovementioned time interval will be reduced to one half.

The decade counter DC3 starts to count the first pulse at an instant 0.5 m sec (millisecond) after the change over of the input signal 121 from L to H state. In this case, because the oscillation frequency of the oscillator OS3 is 256 KC/S, an error of 1/256,000 sec = 0.004 m sec will be introduced into the operation. However, such an error will be neglected for the purpose of simplicity. The decade counter DC3 counts one of the input pulses every 0.5 m sec.

In the decoder D3 connected to the output side of the decade counter DC3, the output 301 is maintained in the state L, and all of other outputs are maintained in the H state until 0.5 m sec. has passed after the input signal was transferred from L to H.

Figure 4:
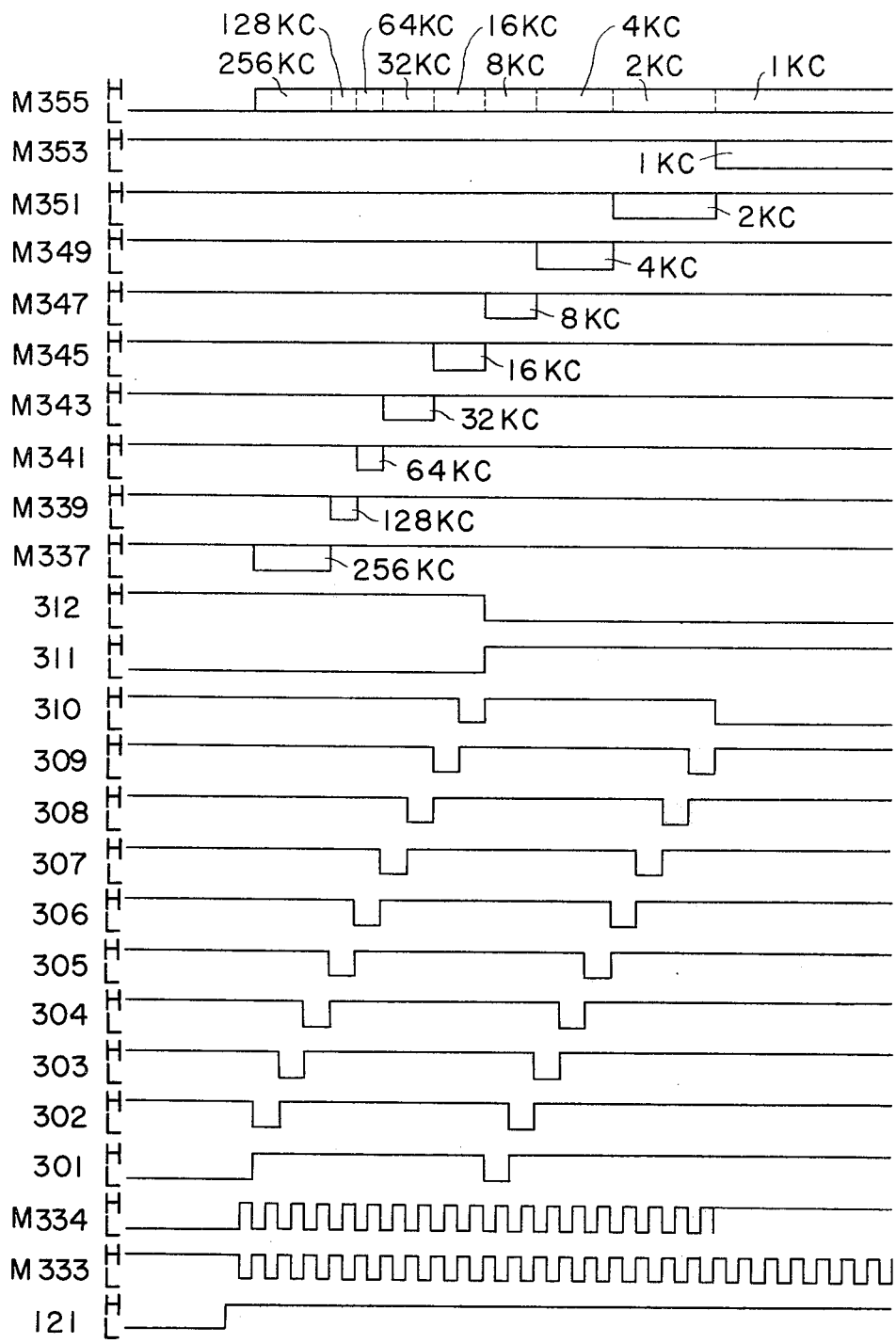
FIG. 4 is a diagram showing waveforms at various parts of the circuit shown in FIG. 3.

For a time interval of from 0.5 m sec to 1.0 m sec, the output from the terminal "1" becomes L and all of other outputs become H. In a similar manner, after the elapse of every 0.5 m sec, the occurrence of the L state is shifted to the subsequent output. In FIG. 4, it is clearly seen that the time intervals, wherein the outputs 301 through 310 are maintained in the L state, are successively shifted to the right-hand side according to this order. In FIG. 4, it is also seen that the transfer of the output 301 from L to H occurs 0.5 m sec after the variation of the input signal from L to H.

In the above described manner, the output D of the decade counter DC3 is changed from H to L state after 5.0 m sec from the initiation of the counting operation. The output D of the decade counter DC3 is also connected to the input terminal T of the flip-flop F3, whereby the output from the terminal $\overline{Q}$ is changed from L to H thereafter maintained in this state, and the output from the terminal Q is changed reversely from H to L. Thus, in the time interval of from 5.0 m sec to 5.5 m sec, the output 301 of the decoder D3 is again maintained in the L state, and in a similar manner, the output 310 of the decoder is brought into the L state after 9.5 m sec. At this instant, since the output 311 of the flip-flop F3 is in the H state, the output of the inverter M352 which is inverting the output 310 is also changed from L to H.

Accordingly, two inputs of the NAND element M354 become H, and hence the output thereof is changed to the L state. Thus the output of the NAND element M344, in the middle part of FIG. 3, having an input connected to the output of the NAND element M354 become H, and the counting operation of the decade counter DC3 is interrupted. As a result, the output 310 of the decoder D3 is maintained in the L state, and this L state continues to an instant when the input signal 121 is again brought into the L state. When the input signal 121 is again brought into the L state, the flip-flop F3, binary counters BC31 and BC32, and the decade counter DC3 are all reset.

Summarizing the above description, the decoder D3 starts its operation when the input signal 121 is changed from the L state to the H state, and after two cycles of the operation, the output 310 is maintained in the L state which continues until the input signal 121 is changed from the H state to the L state.

Proceeding to the operation of the lower part of the circuit shown in FIG. 3, the NAND elements and inverters designated by even and odd reference numerals are combined together so that two elements having closely adjacent reference numerals, such as M336 and M337, M338 and M339, and so forth, cooperate in pairs as follows. Roughly speaking, these NAND elements and inverters receive the output frequency of the oscillator OS3 or the outputs of the decoder D3, and deliver or do not deliver these signals from the output terminals.

In consideration of, for instance, a pair of NAND elements M336 and M337 located in the upper left part of FIG. 3, three inputs 302, 303, and 304 of the NAND element M336, which are corresponding outputs from the decoder D3 are all maintained in the H state after an instant where the input signal 121 has been changed from L to H. Accordingly, the output of the NAND element M336 is maintained in the L state, and the output of the NAND element M337 is maintained in the H state. That is, the output frequency of the oscillator OS3 applied to an input of the NAND element M337 cannot pass through the NAND element M337.

In the meantime, when 0.5 m sec has passed, only the output 302 of the decoder D3 is brought into the L state during a time interval of from 0.5 to 1.0 m sec, whereby only one input within the three inputs of the NAND element M336 is in the L state, and others are kept in the H state. On the other hand, three inputs of the NAND element M337 consist of an output from the terminal Q of the flip-flop F3 maintained in the H state (see FIG. 4), the abovementioned output of the NAND M336 which is also maintained in the H state, and the output frequency of the oscillator OS3. Thus, the output frequency of the oscillator OS3 passes through the NAND element M337 with reversed polarity and is sent to the NAND element M355 located at the right-hand side of FIG. 3. At this instant, all of the rest of the inputs of the NAND element M355 are in the H state as will be made apparent hereinbelow, whereby the output 313 of the NAND element M355 comprises the output of the oscillator OS3 which has a frequency of 256 KC/S. The output is maintained while the input 304 of the NAND element M336 is maintained in the L state.

When the L state of the input 304 terminates, all of the inputs of the NAND element M336 become H, and the output of the NAND element M336 is thereby brought into the L state. Since one input of the subsequent NAND element M337 is brought into the L state, the output thereof is in the H state, and this output is sent to the NAND element M355 at the right-hand side of FIG. 3.

Termination of the L state in the input 304 is instantaneously followed by the initiation of the L state in the input 305, and since the input 305 is applied to the inverter M338 in the succeeding pair of the elements, the output of the inverter M338 is in the H state. Now, two within three inputs of the NAND element M339 are in the H state, the remaining one input consisting of the output from the terminal A of the binary counter BC31, of 128 KC/S, is passed through the NAND element M339 with reversed polarity, and the output of the NAND element M339 of 128 KC/S is again sent to an input terminal of the NAND element M355 at the right-hand side of FIG. 3. At this time also, other inputs of the NAND element M355 are all in the H state, whereby the output A of the binary counter BC31, which is of a frequency of 128 KC/S, appears at the output 313 of the NAND element M355, and this output is maintained while the input 305 is in the L state.

The operations are repeated in the same manner, and at an instant when the pair of elements M344 and M345 just terminate sending of the output from the terminal D of the binary counter BC31 to the NAND element M355, the state of the output from the terminal D of the decade counter DC3 is changed thereby to change the state of the input T of the flip-flop F3 from the L state to the H state, whereby the outputs from the terminals Q and $\overline{Q}$ of the flip-flop F3 are reversed. That is, the output 311 from the terminal Q is changed into the H state as shown in FIG. 4.

As a result, the input 311, which is introduced into the plurality of NAND elements designated by odd reference numerals included in the element pairs, such as M347 and M348 and so forth, is maintained in the H state. Thus, only an element deisignated by an odd reference number in a pair which receives a further H input from the other element in the pair can send out a pulse to the ultimate NAND element M355 while the rest of the pairs deliver H output to the NAND element M355. The above described H input from the other element in the pair, that is, from an even number element in the pair, occurs only when at least one within the inputs introduced into the even number element from the decoder D3 is in the L state.

From the above description, it will be apparent that, in the ultimate NAND element M355, and output pulse from the oscillator OS3 and the outputs from the terminals A, B, C, and D of the counters BC31 and BC32 appear sequentially in this order. The initiation of this appearance of outputs is 0.5 m sec after the conversion of the input signal 121 from the L state to the H state, and the output from the terminal D of the binary countet BC32 binary appears at the output 313 of the ultimate NAND element M355 at an instant 9.5 m sec later from the conversion of the input signal 121 from the L state to the H state.

As described hereinbefore, the output 310 of the decoder D3 is maintained in the L state after it is once turned into the L state until the input signal 121 is again turned into the L state. Furthermore, the output from the terminal Q of the flip-flop F3 is maintained in the H state. Accordingly, the ultimate NAND element M355 continues to deliver the output of 1 KC/S obtained from the terminal D of the binary counter BC32 as long as the input signal is maintained in the H state.

Figure 5:
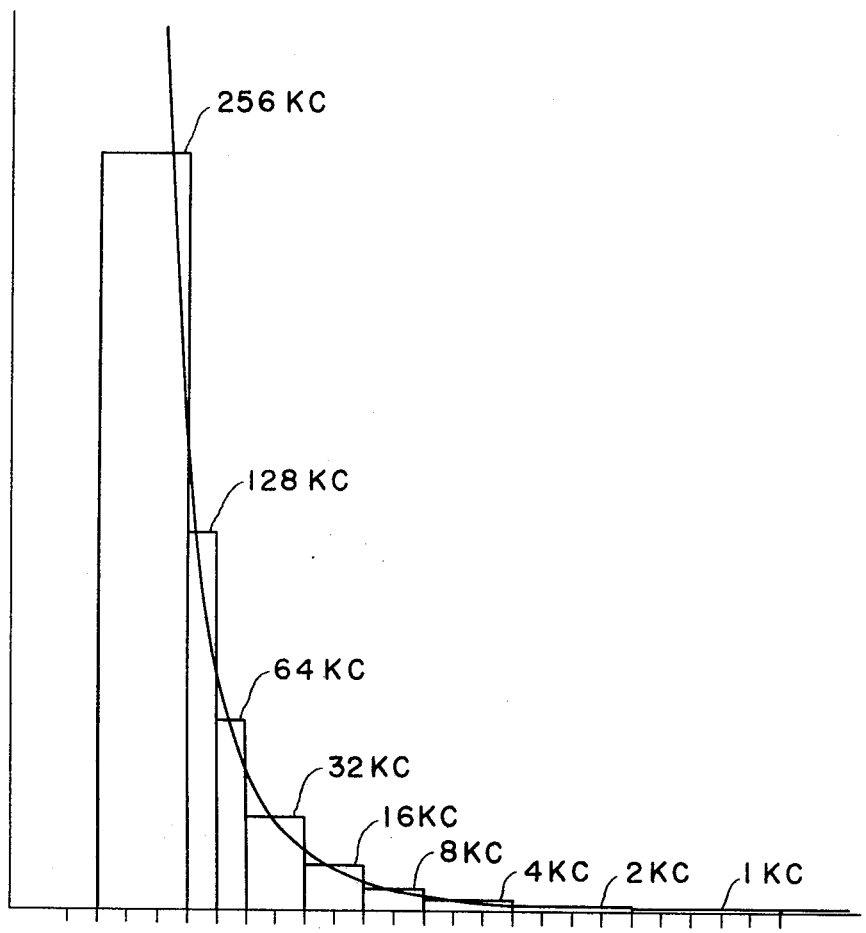
FIG. 5 is a graph showing output frequencies obtained from the modulation frequency generating circuit at various time instants.
Figure 5:
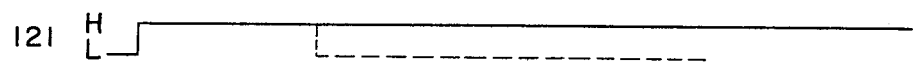
Figure 5:

The output 313 of the ultimate NAND element M355 is indicated in FIG. 5. The output frequency is sequentially reduced from the initial value of 256 KC/S to the last value of 1 KC/S within 10 m sec. It should be noted that in the case where the input signal 121 is changed, at a certain instant, from the H state to the L state as shown by dotted line, the output 313 is instantaneously reduced at the instant from a value of, for instance, 64 KC/S which is delivered just before the instant to the L state.

As described before, in the known practices, the vehicle speed of an automobile is detected, and the braking force is controlled so that the wheels are rotated at a speed corresponding to 80% of the vehicle speed. The above-mentioned 80% has been believed to be an optimum value in consideration of the road condition and other factors. Since it is impossible to mount an apparatus capable of detecting an absolute vehicle speed relative to the ground on an automobile, the highest rotating speed of the wheels has been sensed as a practical measure, and assuming that the highest rotating speed of the wheels is representing the vehicle speed, the rotating speed of the wheels has been controlled to approximately 80% of the vehicle speed sensed in the form of pulses.

However, the actual rotating speeds of wheels under braking operations are very complicated, and the identity of the wheel rotating at the highest speed cannot be determined with complete reliability. We have studied this problem intensely and have filed a patent application for a digital circuit operable to detect the highest rotating speed of the wheels. The input signal 121 described hereinbefore comprises the pulses indicating the maximum rotating speed among the speeds of all wheels.

However, it is found that the desired optimum control of the braking force cannot be attained even if the actual rotating speed of the wheels is simply controlled to approximately 80% of the vehicle speed represented by the input signal 121.

For this reason, in the present invention, the input signal 121 in the form of a pulse is subjected to a correction or adjustment so that the vehicle speed represented by the input signal is decelerated in the braking operation by at most 1.2 G, and the rotating speed of the wheels is controlled to approximately 80% of the vehicle speed thus being decelerated constantly. The vehicle speed thus decelerated constantly is hereinafter called "simulated vehicle speed", which is obtained as follows.

Referring now to FIG. 6, there is indicated a pulse conversion circuit 600 constituting a part of the simulated vehicle speed producing circuit. The circuit 600 includes counters C61 and C62. The counter C61 comprises flip-flops F601 through F610 connected together in series. The counter C62 comprises flip-flops F611 through F620 connected together in series. The circuit 600 further includes full-adders FA61, FA62, and FA63.

Input terminals A1 through A4 and input terminals B1 through B4 of the full-adder FA61 are connected to the output terminals Q of the flip-flips F601 through F604 in the counter C61 and the output terminals Q of the flip-flops F611 through F614 in the counter C62, respectively. Likewise, input terminals A1 through A4 and input terminals B1 through B4 of the full-adder FA62 are connected to the output terminals Q of the flip-flops F605 through F608 in the counter C1 and the output terminals Q of the flip-flops F615 through F618 in the counter C62, respectively. The input terminals A1, A2, B1, and B2 of the full-adder FA63 are connected to the output terminals Q of the flip-flops F609 and F610 in the counter C61 and the terminals Q of the flip-flops F619 and F620 in the counter C62, respectively.

An output terminal C4 of the full-adder FA61 is connected to an input terminal C1 of the full-adder FA62, and an output terminal C4 of the full-adder FA62 is connected to an input terminal C1 of the full-Adder FA63. An output terminal S2 of the full-adder FA63 is connected to an input terminal D of a D type flip-flop DF6.

Input terminals S of all of the flip-flops F601 through F610 in the counter C61 are commonly connected to the output 106 of the decoder D1 in FIG. 1, and an input terminal T of the first flip-flop F601 in the counter C61 is connected to the ultimate output 313 of the modulation frequency generating circuit 300 in FIG. 3. Thus, the counter C61 counts the ultimate output 313 of the circuit 300.

Input terminals S of all of the flip-flops F611 through F620 in the counter C62 are connected to the output terminal Q of the D type flip-flop DF6 through a NOR element N6 and an inverter element M66. Another input of the NOR element N6 is connected to the output 106 of the decoder D1 in FIG. 1. An input terminal T of the flip-flop F611 located at the leftward end of the counter C62 is connected through NAND elements M61 and M62 to the ultimate output 313 of the circuit 300. Another input of the NAND element M61 is connected to output terminal $\bar{Q}$ of the D type flip-flop DF6, and another input of the NAND element M62 is connected to the output 104 of the decoder D1 in FIG. 1.

The input signal 121 representing the sensed pulses corresponding to the highest rotating speed of the wheels is introduced into an input terminal of a NAND element M64, and another input of the NAND element M64 is connected to the output of another NAND element M63. The output 1000 of the NAND element M64 constitutes the simulated vehicle speed. The output terminal Q of the D type flip-flop DF6 and the output S2 of the full-adder FA63 are simultaneously connected to the input terminals of the NAND element M63.

A switch S6 which operates cooperatively with the brake system of an automobile is closed to the ground when the brake is operated, and an input of a NAND element M65 connected to the switch S6 is brought into the L state. When the brake is not operated, the switch S6 is open, and the input of the NAND element M65 is returned to the H state. The output of the NAND element is connected to an input terminal R of the flip-flop DF6, and another input of the NAND element M65 is connected to the output 104 of the decoder D1 in FIG. 1 through an inverter M67. Furthermore, an output 102 from the terminal 1 of the decoder in FIG. 1 is connected to an input terminal T of the D type flip-flop DF6.

The operation of the circuit 600 shown in FIG. 6 will now be described in detail.

The circuit 600 receives three kinds of inputs. That is, from the circuit 100 in FIG. 1, inputs 102, 104, and 106 are supplied. From the circuit 300, an input 313 is supplied to the first flip-flop F601 in the counter C61 and also to an input terminal of the NAND element M61. An input 121 from a wheel speed sensor (not shown) is also supplied to the NAND element M64.

Timing relationships of the operations of the circuits 100, 300, and 600 will now be described. The circuit 100 generates a series of output pulses while the input 121 from the wheel speed sensors is in the L state, and when the input 121 is brought back to H state, the operation of the circuit 100 is reset. The circuit 300 is maintained in the L state while the input signal 121 is in the L state, and it delivers the hereinbefore mentioned modulation frequencies when the input signal is in the H state. Accordingly, when the input signal 121 is in the L state, the input 313 includes no pulses to be counted in the counter C61 in the circuit 600, whereby the circuit 600 is merely prepared for the later operation when the trigger pulses 102, 104, and 106 are introduced from the circuit 100.

When the input pulse 121 is transferred into the H state, the circuit 300 delivers the modulation frequency pulses which are to be counted in the counters C61 and C62. On the other hand, when the input signal 121 is in the H state, all of the inputs 102, 104 and 106 obtained from the decoder D1 in the circuit 100 are maintained in the H state. It should be noted that the delivery of the modulation frequency pulses from the circuit 300 is delayed by 0.5 msec. from the transferring instant of the input signal 121 from the L state to the H state, and the modulation frequency pulses are blocked when the input signal 121 is transferred to the L state.

During the braking operation of automobile, the switch S6 in FIG. 6 is closed, and the position a of the circuit is maintained in the L state, the output of the NAND element M65 being brought into the H state. Thus, the input R of the flip-flop DF6 is continually kept in the H state while the brake of the automobile is operated.

Figure 7:
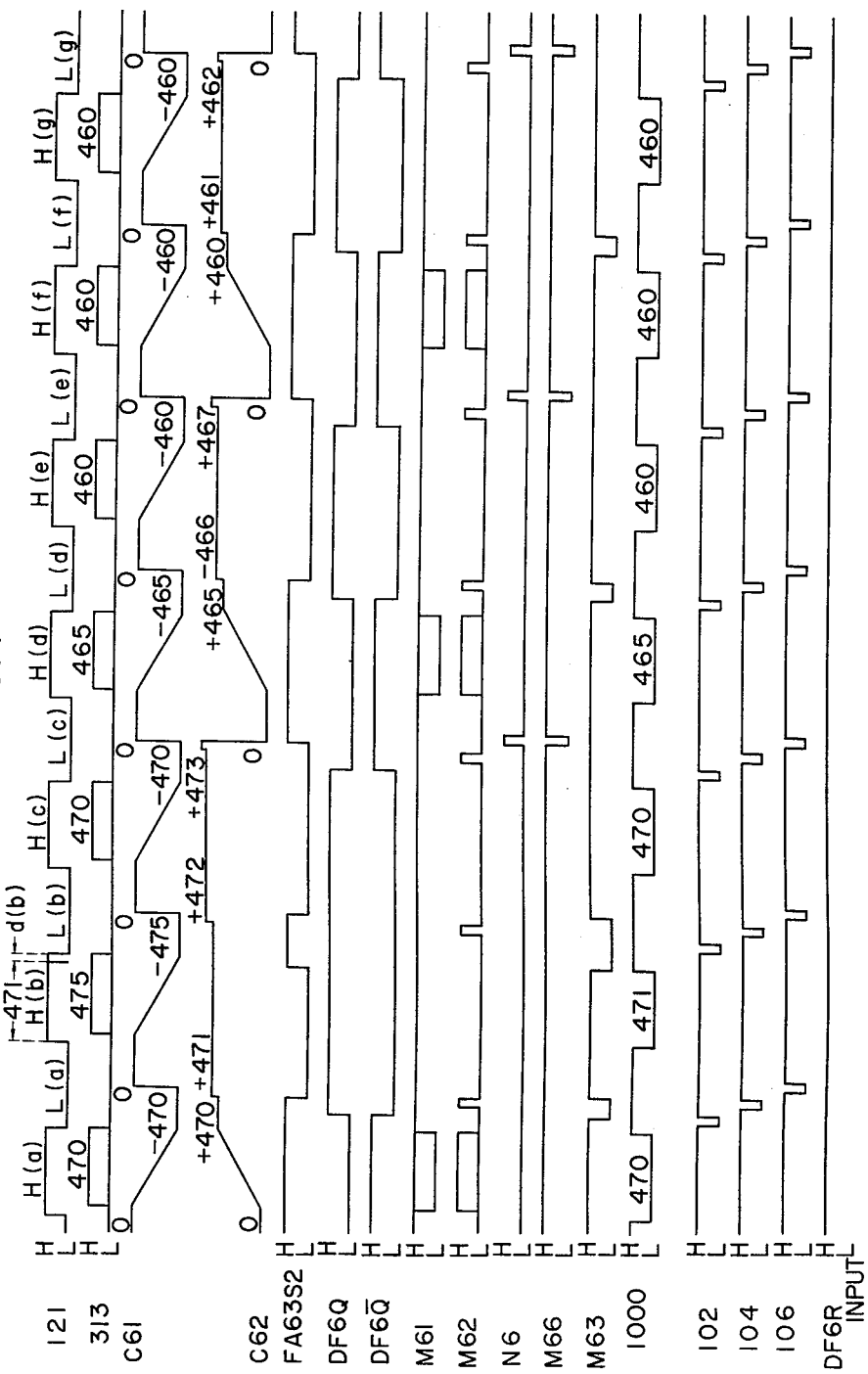
FIG. 7 is a waveform diagram showing the waveforms at various parts of the circuit shown in FIG. 6.

Referring now to FIG. 7; when the input 121 is brought into the H state, inputs 102, 104, and 106 are all maintained in the H state as describe above, after 0.5 msec. from the instant when the input signal is brought into the H state, the input 313 sets up the modulation frequency pulses as described above. Since the input 106 connected to the terminals S of the flip-flops F601 through F610 is in the H state, the counter C61 immediately starts the counting operation of the input 313 (i.e., the modulation frequency pulses).

The input 313 also connected to the NAND element M61 passes through the NAND element with the polarity reversed (it being assumed that the output from the terminal $\overline{Q}$ of the flip-flop DF6 is in the H state) and again passes through the NAND element M62 with the polarity reversed again (because another input of the NAND element M62 is the input 104 which is in the H state). Thus the counter C62 counts the modulation frequency pulses contained in the input 313 in synchronism with the counter C61. The results obtained from the counters C61 and C62 are indicated in an analog manner in FIG. 7. It should be noted that the counter C61 counts the pulses in the negative sense starting from 0, whereas the counter C62 counts the pulses in the positive sense starting from 0. This is an important feature of this circuit 600, and because of this feature, the braking force can be so controlled that the desired deceleration of 1.2 G is realized.

The two counters C61 and C62 count the pulses in the opposite directions as described, and it is assumed that the input signal 121 is transferred into the L state when the counters C61 and C62 have counted −470 and +470, respectively, whereby the H (a) period of the input signal 121 terminates. Since the sum of the two counted results is 0, the output from the terminal S2 of the full-adder FA63 is in the H state.

Because the input signal 121 is now changed into the L (a) state, the timing pulse generating circuit 100 starts its operation, and the output signals 102, 104, and 106 each including an L pulse (or an L state) occurring in this order, are delivered as shown in FIG. 2. Since the input pulse 102 is changed from the H state to the L state and again into the H state as shown in FIG. 2, the Q output of the flip-flop DF6 is brought into the H state by a trigger pulse caused by the returning step, from L to H, of the input pulse 102 as a result of the D input of the same flip-flop having been brought into the H state.

After the elapse of a predetermined period, the input 104 causes an L pulse as shown in FIG. 2, whereby the NAND element M62 located downward and leftward in FIG. 6 delivers an H pulse. Thus, the counter C62 adds one to the counted result so that the so far obtained +470 is increased to +471.

The above-mentioned addition of one to the counted result serves to realize the deceleration of 1.2G as will be described hereinlater in more detail.

When another predetermined period has elapsed, the input pulse 106 produces an L pulse as seen in FIG. 2. Thus, the upper counter C61 is reset to 0. However, the counter C62 continues to memorize the above-mentioned value +471. Since the input pulse 106 is further applied to the NOR element N6 which is also receiving the Q output, in the H state, from the flip-flop DF6, the output of the NOR element N6 is maintained in the L state. The output in the L state is reversed into the H state in the inverter M66 and applied to the terminals S of the lower counter C62, whereby the counter C62 continuously memorizes the value of +471.

In the meantime the L (a) period of the input signal 121 terminates, and the H (b) period thereof begins. The modulation frequency generating circuit 300 again delivers the modulation frequency pulses 313, and the counter C61 counts these pulses. It will now be assumed that a braking force is applied to the wheels so that the wheel speeds are reduced, and the counter C61 counts −475. The increase in the counted result is caused by the fact that the application of the braking force reduces the wheel speed, whereby the one cycle period of the input pulses 121 obtained from the sensor is elongated, and a greater number of pulses can be counted by the counter C61. It should be noted that the absolute value of the counted results in both of the counters C61 and C62 are increased when the wheel speed is reduced, and are decreased when the wheel speed is increased.

In the course of the counting operation of the counter C61 to obtain the above mentioned −475, the summation in the full-adders of the counted results in the counters C61 and C62 causes the sum of the results to pass through zero at an instant where the counter C61 has just counted −471. For this reason, the output from the terminal S2 of the full-adder FA63 is changed from L to H at this instant, as shown in FIG. 7, and this H is applied to an input terminal of the NAND element M63 located centrally downward in FIG. 6. At this time, the other input of the NAND element M63, which is the Q output of the flip-flop DF6, is maintained in the H state. Accordingly, the output of the NAND element M63 is changed from the H to L state, whereby the ultimate output 1000 from the subsequent NAND element M64 is changed from the L to H state.

It should be noted that the ultimate output 1000 from the NAND element M64 has been so far in the L state corresponding to an inversion of the input signal 121, and the output 1000 is now changed to the H state. In FIG. 7, the above-mentioned L state of the output 1000 is designated as L 471. The duration of the L 471 is shorter than that of the H (b) of the input signal 121 by an amount designated by d (b).

However, if the sum of the counted results in the counters C61 and C62 had not become zero but had continued to be a positive value, the above-mentioned shortening of the L state would not have been caused, and an L 475 of a length equal to the H (b) would have been obtained from the NAND element M64 as the output 1000. That is, the length of the L state in the output 1000, which corresponds to the memorized counted value in the counter C62, is always shorter than or equal to the length of the L state in the input signal 121. For instance, the L 470 of the output 1000 appearing at the leftward extremity in FIG. 7 has a length equal to that of the H (a) of the input signal 121 because the Q output at that time of the flip-flop DF6 is in the L state, and the output of the NAND element M63 is kept in the H state regardless of the output S2 of the full-adder FA63.

Now, the H (b) period of the input signal terminates and the L (b) period thereof starts. However, the output 1000 is maintained in the H state, whereas in the meantime the counter C61 stops its counting operation. The timing pulse generating circuit 100 again resumes its operation, and the outputs 102, 104, and 106, each including an L pulse occurring sequentially, are again delivered from the circuit 100. However, the output 313 of the modulation frequency generating circuit 600 is maintained in the L state during the above described operation.

Then, the L pulse in the output 102 is again introduced into the T terminal of the flip-flop DF6. At this time, the Q output of the flip-flop DF6 is maintained in the H state because the sum 471−475 obtained in the full adder FA63 is negative and the output from the S2 terminal thereof is in the H state (T input is in the H state as in the previous operation). After a predetermined period, the L pulse in the output 104 is applied to the input terminal of the inverter element M67. Since the point a is maintained in the L state while the brake is operated, the NAND element M65 is not influenced by the L pulse of the output 104 and the output of the NAND element M65 is maintained in the H state. Thus, the output of the flip-flop DF6 is not thereby varied.

On the other hand, the input 104 applied to the NAND element M62 causes an H pulse in the output thereof. Accordingly, the counter C62 counts the pulse and varies the output thereof from 471 to 472. After a predetermined period, the input 106 causes an L pulse. The counter C61 receiving this pulse directly is reset to the zero state. Since the reset input for the other counter C62 is not changed, the counted value +472 is still maintained in the counter C62. In other words, the input 106 is introduced into the NOR element N6, and since the other input thereof obtained from the Q output of the flip-flop DF6 is maintained in the H state, the NOR element N6 is not influenced by the L pulse of the input 106, whereby the output of the NOR element N6 is maintained in the L state. The L state of the output of the NOR element N6 is reversed in the inverter M66, so that the H state in the terminals S of the counter C62 is maintained as described above, and the counted result +472 is memorized in the counter C62.

However, the counter C62 has been reset to zero as described before; the sum of the two counters is now changed from the above-mentioned negative value to a positive value; and the output from the terminal S2 of the full-adder FA63 is changed from H to L. During the above described operation, the output 1000 is maintained in the H state.

When the input signal 121 is changed from the L (b) to H (c), the output 1000 is changed from H to L state. The reason for this is that the output from the terminal S2 of the full-adder FA63 is maintained in the L state as described above, whereby the output of the NAND element M63 is kept in the H state. According to the transfer of the input signal 121 from L (b) to H (c), all of the inputs 102, 104, and 106 are kept in the H state as described before, whereby the content of the input 313 from the modulation frequency generating circuit 300, which has been maintained in the L state, is now changed into a state exhibiting the modulation frequency pulses, whereby the counter C61 again starts the counting operation in the negative direction.

Now it is assumed that the brake is released to some extent, and the wheel speed is somewhat high. Thus, the number of pulses obtained from a sensor cooperating with the wheel of the highest speed is increased, and one cyclic period of the input signal 121 is thereby shortened.

Thus, the counter C61 counts the above-mentioned modulation frequency pulses generated from the circuit 300 during the above-mentioned shortened H state of the input signal 121, and the counted result is assumed to be −470. Since the absolute value of this counted result in the counter C61 is less than the memorized value +472 in the counter C62, the sum of these values is still positive, whereby the polarity of the output of the full-adder is not changed. Thus, the previously described shortening of the L period in the output 1000 to a value shorter than the H period of the input signal 121 is not caused, and after the termination of the L period equalling the H period of the input signal 121, the output 1000 is returned to the H state when the input signal 121 is transferred from the H (c) state to the L (c) state. The length of the L period of the output 1000 is equal to the length of the H (c) period, corresponding to 470, of the input signal 121.

When the input signal 121 is changed to the L state, the input 313 is held in the L state, and simultaneously the timing pulse generating circuit 100 operates so that the decoder D1 therein starts the counting operation. When an output 102 of the decoder D1 enters the flip-flop DF6, the output Q thereof is changed to the L state because the input D of the flip-flop DF6 is already receiving the output S2, in the L state from the full-adder FA63. Thus, when the output 104 from the decoder D1 in the circuit 100 is introduced into the NAND element M62, the element M62 simply passes the input 104 with its polarity reversed, whereby the memorized amount in the counter C62 is further increased additively by 1, so that the amount is increased to 473 (the input 313 of the NAND element M61 at this time being kept in the L state so that the output thereof is kept in the H state).

When the output 106 of the decoder D1 in the circuit 100 arrives thereafter, both of the counters C61 and C62 are now reset to zero, and the memorized amount of 473 will have no effect on the operations of the succeeding circuits. The resetting of the counter C61 has been described hereinbefore. The manner in which the counter C62 is reset will now be described.

Since the NOR element N6 has an input obtained from the output terminal Q of the flip-flop DF6, which is at this instant kept in the L state, the output of the NOR element is changed from the L state to the H state upon receiving an L pulse in the input 106 which constitutes another input of the NOR element N6. The H output from the NOR element N6 is reversed into the L state in the inverter M66, whereby the counter C62 is reset at zero.

Because both the counters C61 and C62 are reset at zero, the sum of the counted results in these counters becomes zero, and the output from the terminal S2 of the full-adder FA63 resumes the H state, and one cyclic operation of the circuit 600 during the braking operation is thereby terminated. It will be recalled that in the L (b) period of the input signal 121, the counter C62 has not been reset at zero, but in the L (c) period of the same signal, the counter C62 is reset at zero as described above. The reason for this is as follows.

As described hereinbefore, in the L (b) period, the wheel speed of the automobile has been decelerated, whereas in the L (c) period, the wheel speed has been accelerated. Thus, the period H (c) in the input signal 121 is shorter than the period H (b), and hence the period utilized by the circuit 300 for generating pulses is shortened. It should be noted that a shorter period of the H state in the input signal 121 means an increase in the wheel speed in an automobile.

The counter C62 counts the modulation frequency pulses from the circuit 300 in the H (a) period of the input signal 121, and this means that the speed of a wheel rotating at the highest speed at any instant is detected. During the above described counting operation of the counter C62, and L state of the same length as of the period H (a) in the input signal 121 is maintained in the output 1000 from the circuit 600. The length of the L state in the output 1000 represents the simulated vehicle speed.

In the period H (b) of the input signal 121, the counter C62 has memorized a speed which is obtained by reducing the vehicle speed detected in H (a) period by a fraction corresponding to 1.2 G (by adding 1 to 470). In the case where the speed represented by H (b) is lower than the speed memorized in the counter C62, that is, when the value which the counter C61 counted in the H (b) period is greater than the above-mentioned (470 + 1), and L state of a length corresponding to the speed memorized in the counter C62 appears in the output 1000. During the comparing operation, the value (470 + 1) memorized in the counter C62 is further increased additively by 1 corresponding 1.2 G, and the thus added result is memorized in the counter C62 to be prepared for the subsequent H state in the input signal 121.

When it is judged that the speed represented in the H (c) is greater than the speed memorized in C62, that is, when the value counted by C61 during the H (c) period is less than 472, an L state of a length corresponding to the speed signified by H (c) appears in the output 1000. Then, the counter C62 is reset at zero for renewing the detection of the wheel speed.

In the anti-skid control device according to the present invention intended to control a vehicle speed relative to the ground to a value coincident to 1.2 G, the counted value in the counter C62 is increased additively by 1 before it is compared with the counted result in the counter C61. In other words, the counted value +470 shown in FIG. 7 is corrected to +471, and the value memorized is compared with the next counted value in the counter C61. The purpose of adding 1 as described above is to equalize the reduced vehicle speed to the 1.2 G. In the operation during H (b) and L (b), a value +471 means a deceleration of 1.2 G, and −475 means that the vehicle is decelerated at a value greater than the above indicated 1.2 G. In other words, it means that the H (b) period in the input signal 121 was too long.

If the excessively long H (b) period were to be maintained in the length of the L state of the output from the NAND element M64, the output 1000 thus obtained would not be suitable for the braking control at 1.2 G. Accordingly, the L state in the output 1000 is corrected to 471 corresponding to 1.2 G. In other words, the length of the L state in the output 1000 is reduced from the value corresponding to H (b) by the length of d (b).

On the other hand, the length H (c) in the input signal 121 is shorter then that corresponding to 1.2 G, whereby both counters are reset to zero and the wheel speed is again read out through sensors.

In the case where the newly read out rotating speed of the highest speed wheel is 465 as represented by H (d) in the input signal 121, the counter C62 has memorized a value 465 + 1 in the L (d) period, and the counter C61 is again reset at zero in order to newly read out the wheel speed. In the next H (e) period, the thus newly read wheel speed −460 is compared with the memorized value +466 in the counter C62. Since the wheel speed is faster than that corresponding to 1.2 G, both counters are again reset to zero. The above described operations are repeated incessantly until the vehicle speed becomes zero.

Summarizing the above description, in the periods H (a), H (d), H (f), ..., both counters newly count the read out wheel speed at that time, and only when the newly read-out wheel speed is slower than that corresponding to 1.2 G, the counter C62 continuously memorizes the corrected value of the wheel speed as shown in the period extending from L (a) to L (c). During the braking operation of the automobile, the L states in the output 1000 are always maintained at lengths equal to the lengths of the L states in the input signal 121, except when the wheel speed is reduced excessively with a deceleration exceeding the 1.2 G, and hence the anti-skid braking control as described hereinbefore can be obtained.

Summarizing the operation of the pulse conversion circuit 600, the counter C61 operates exactly during one half cycle period of the input signal 121 whereby a wheel speed corresponding to the highest speed wheel is read out, whereas, the counter C62 first counts the wheel speed in synchronism with the counter C61 and, when it is required, corrects the counted value by adding 1 until a wheel speed corresponding to the deceleration of 1.2 G is thereby obtained. The corrected value in the counter C62 is then compared with the wheel speed subsequently read out in the counter C61, and these operations are repeated until the vehicle speed becomes zero.

It should here be noted that the correction of the counted value in the counter C62, which is accomplished by adding 1 successively, must be carried out in accordance with the vehicle speed of the automobile. That is, the actual value of 1 must be differentiated between the cases where the automobile is running at a high speed and at a low speed. This is realized by the use of the modulation frequency pulses obtained from the circuit 300 as shown in FIG. 5.

When the wheel speed is comparatively high, the length of the H state in the input signal 121 is short, and when the wheel speed is comparatively low, the length of the H state in the input signal 121 is long. In the counters C61 and C62, since the input 313, which is the modulation frequency pulses as shown in FIG. 5, is counted as described hereinbefore during the H state of the input signal 121, the terminating instant of the counting operation in the case of a higher wheel speed is located leftwardly of the terminating instant of the counting operation in the case of a lower wheel speed, as clearly seen in FIG. 5. Thus, one cycle period added to the counted result in the case of a higher wheel speed is shorter than that added to the counted result in the case of a lower wheel speed. Such a one cycle period that is different by the wheel speed is added to the counted result in the counter C62, and the terminating instant of the L state in the load 1000 can be automatically varied in accordance with the wheel speed.

Figure 8:
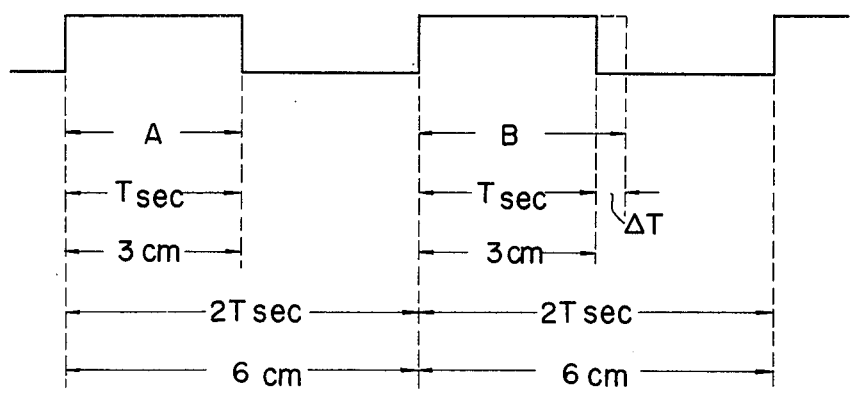
FIG. 8 is a diagram showing pulse conversion operation of the circuit shown in FIG. 6 and operation for obtaining a vehicle speed simulating pulse train.

Referring now to FIG. 8, the operational principle of the circuit for providing the simulated vehicle speed relative to ground will be described more theoretically.

It is assumed that a wheel of an automobile, which is intercoupled with a sensor for issuing an input signal 121 for this circuit, has been rotated so that a linear speed of 6 cm per cyclic period 2T sec. of the input signal 121 is obtained. Within the one cyclic period, the period in the H state is T sec., being exactly one half of the one cyclic period. Thus, the wheel rotates in the period of the H state for a length of 3 cm.

In the braking operation, the wheel speed is reduced, and one cyclic period of the input pulse signal 121 is elongated. Here, the period of the H state in the input signal 121 is assumed to be elongated from the above described T sec. to $(T + \Delta T)$ sec. as shown at B in FIG. 8. It is further assumed that the elongated period $(T + \Delta T)$ of the H state corresponds to a reduced speed of the wheel whereby the deceleration of 1.2 G is obtained, and $\Delta T$ corresponds to one cyclic period of a pulse at the trailing edge of the modulation frequency input 313 as shown in FIG. 5.

As stated above, a linear speed of the wheel within the section A in FIG. 8 is 3/T [cm/sec], and the linear speed there of within the section B is $3/(T+\Delta T)$ [cm/sec]. Thus, the difference in wheel speed between the two sections is expressed as $3/T - 3/(T+\Delta T)$ [cm/sec], and the deceleration within this period can be calculated as $(3/T - 3/(T+\Delta T))/2T$ per sec. Since it is desired to equalize this deceleration, to the 1.2 G, $(3/T - 3(T+\Delta T))/2T = 1.2 \times 980$ cm. From the above equation, $\Delta T$ can be calculated as $$\Delta T = \frac{784\,T^3}{1 - 784\,T^3}$$

As described hereinbefore, $\Delta T$ is equal to one cyclic period of a pulse at the trailing edge of the modulation frequency input 313, and the frequency F of the modulation frequency pulses generated from the circuit 300 at an instant of the trailing edge is expressed as $$F = \frac{1 - 784\,T^2}{784\,T^3}\,[c/s].$$

When T is rewritten as a time function, the modulation frequency pulses obtained from the output terminal 313 of the circuit 300 can be defined. In fact, FIG. 5 is a curve which is obtained by plotting this function with respect to time.

On the other hand, circuits (not described hereinbefore), which are operated by the output 1000 obtained from the circuit 600, are operated by the sections, in the L state, of the output 1000, and the sections, in the H state, have no effect on the operation of the succeeding circuits. Since the output 1000 is, generally speaking, an inversion of the input signal 121, it may be considered that the input signal 121 is corrected so that the sections thereof, in H state, are elongated by $\Delta T$ as described above for allowing the realization of the desired deceleration of 1.2 G, and the signal thus corrected is entirely inverted so that the output signal 1000 is obtained.

It should be noted that the hereinbefore set forth equations are established on the basis that the speed of a wheel having the highest rotating speed among a plurality of wheels substantially coincides with the vehicle speed. If the braking operation is initiated on a frozen road having a low frictional coefficient $\mu$, the wheel speed will be substantially different from the simulated vehicle speed defined just after the initiation of the braking operation (because of wheel-lock caused by slipping of the wheels).

For instance, it is assumed that the wheel speed (indicated by the length of one cyclic period of the input signal 121) is lowered to such an extent that the one cyclic period shown in FIG. 8 is changed from 2T sec. to 4T sec. . While $\Delta T$ is added once for every one cyclic period of the input signal 121, the quantity of $\Delta T$ is not varied even if the one cyclic period of the input signal 121 is elongated to twice the previous length as mentioned above.

However, the elongation of the cyclic period of the input signal 121 to two times the previous value reduces to one half the occasions of adding $\Delta T$. That is, the $\Delta T$ provided for realizing a deceleration of 1.2 G will merely cause a deceleration of 0.6 G. The reason for this is that the occasion to add 1 to the counted result in the counter C62 has been reduced to one half. On the surface of a road having a lower adhesive coefficient $\mu$, any braking operation causing deceleration greater than 0.5 G should not be attempted.

For this reason, the above described reduction of the occasion for adding one cycle of a pulse to the counted result is considered to be rather advantageous, and a more closely simulated vehicle speed can be thereby obtained.

Although the operation of the circuit during the braking operation has been described hereinabove, if the brake is not operated, a point $a$ in the pulse conversion circuit 600 assumes the H state, and the counter C62 repeats the counting operation in synchronism with the counter C61 and the resetting to zero operation. Thus, the output 1000 of the simple inversion of the input signal 121 is obtained from the pulse conversion circuit 600.

As will be apparent from the above description, the vehicle speed simulating circuit according to the present invention in one aspect thereof comprises a timing pulse generating circiut 100, a modulation frequency generating circuit 300, and a pulse conversion circuit 600, whereby when the vehicle speed simulating circuit is applied to an anti-skid braking operation of an automobile, the vehicle speed thereof can be controlled in such a manner that a deceleration of an optimum value is always assured. Furthermore, since the entire circuit is made of digital components, the operational life thereof is extremely long, and the heat resistance thereof is also excellent. Since the output of the circuit is obtained by correcting the input pulses from a wheel having a maximum rotating speed with respect to every cycle of the input pulses, the possibility of introducing delay in the braking control can be minimized.

Altough the vehicle speed relative to ground can be simulated as described above, the anti-skid brake control of the desired nature cannot be obtained unless a relationship between the slip (S) of the wheels and the adhesive coefficient ($\mu$) of the road surface is suitably selected. According to the present invention in other aspects thereof, there are provided a method and apparatus whereby the anti-skid braking control of a vehicle can be achieved effectively by maintaining the above-mentioned relationship in a specific range.

Figure 9:
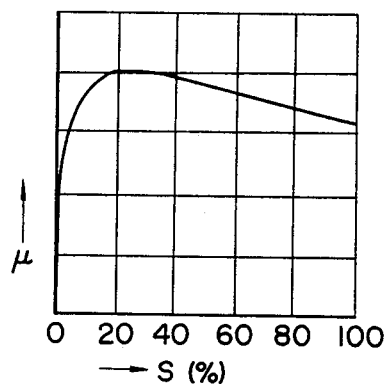
FIG. 9 is a characteristic curve showning a relationship between wheel slip (s) and adhesion coefficient ($\mu$) of a road surface.

Referring now to FIG. 9, there is indicated, in a graphical manner, a relationship between slip (S) of wheels and the adhesion coefficient ($\mu$) of a road surface. As will be apparent from FIG. 9, the adhesive coefficient ($\mu$) of a road surface increases to a maximum value at approximately 20% of the slip (S) and decreases gradually in a range of the slip (S) from 20 to 60%. From the 20% toward 0 of the slip (S), the adhesive coefficient ($\mu$) drops abruptly.

In view of the above described characteristic of the road surface, it would be advisable that the braking operation of a vehicle be controlled in such a manner that the slip (S) is selected at an optimum value which makes possible the utilization of the above described maximum range of adhesive coefficient ($\mu$) of the road surface.

However, because of a delay in the control system or some other reason, it is not easy to control the slip (S) to obtain the maximum adhesive coefficient ($\mu$) of the road surface, and if the slip (S) is reduced to less than the 20% value, the braking effect will be substantially decreased because of the abrupt lowering of the adhesive coefficient ($\mu$).

Thus, according to the present invention, the slip of wheels of a vehicle is controlled in a range of from 20% to 60%, wherein the variation of the adhesive coefficient of a road surface is comparatively small. That is, when a value of slip out of the above described range is detected, the acceleration or deceleration of the vehicle is so corrected that the value of the slip is brought into the above-described range.

The method and apparatus for realizing the anti-skid braking control of a vehicle will now be described with reference to FIGS. 10 through 18.

Figure 10:
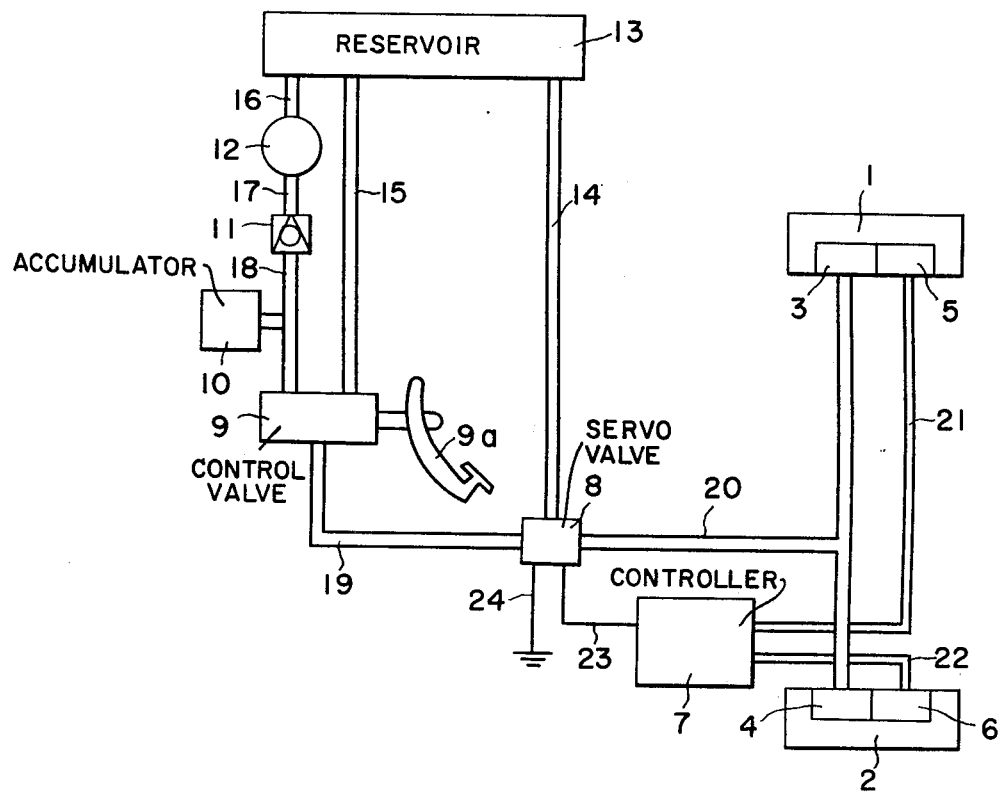
FIG. 10 is a schematic diagram showing one example of an anti-skid brake controlling device according to the invention.

Referring first to FIG. 10, there is indicated an example of a brake control system which is adapted to be applied to a vehicle wherein only the two rear wheels are braked. In the figure, there are shown a right-hand rear wheel 1 and a left-hand rear wheel 2. Adjacent the wheels 1 and 2, braking wheel-cylinders 3 and 4, and wheel-speed sensors 5 and 6 are provided, respectively. Each of the wheel-speed sensors 5 and 6 produces a sinusoidal voltage, the frequency thereof being proportional to the rotating speed of the corresponding wheel. The output signals from the sensors 5 and 6 are applied to a controller 7 so that the output signals from the sensors are processed therein, and a simulated vehicle speed and a controlled wheel speed are thereby calculated. The controlled wheel speed is utilized while braking for presenting a slip (S) adapted to produce a maximum adhesion coefficient for the road surface.

The simulated vehicle speed and the controlled vehicle speed are further compared in the controller 7, and the result of the comparision is used for providing a signal to be applied to a servo valve 8 which in turn controls the hydraulic pressure to be applied to the wheel cylinders 3 and 4. The construction of the controller 7 will be hereinafter described in more detail with reference to FIGS. 11 through 17. The servo valve 8 is connected through a conduit 20 to the wheel cylinders 3 and 4. The former will be described with reference to FIG. 18.

The brake control system further includes a control valve 9 which produces a hydraulic pressure proportional to a force applied to a brake pedal 9a associated with the control valve 9. The hydraulic pressure produced in the control valve 9 is introduced through another conduit 19 to the above-mentioned servo valve 8.

A hydraulic fluid pumped up by a fluid pump 12 from a reservoir 13 through a conduit 16 is passed through a conduit 17, a check valve 11, and another conduit 18 to an accumulator 10, and the fluid thus accumulated is further pressurized in the control valve 9 as described above. The servo valve 8 is further connected to the reservoir 13 thruogh a drain pipe 14, and the control valve 9 is further connected to the reservoir 13 through another drain pipe 15. The controller 7 is connected through lead wires 21 and 22 to the sensors 5 and 6, and through a lead wire 23 to the servo valve 8. The servo valve is grounded through a lead 24.

A preferred example of the controller 7 will now be described in detail with reference to the block diagram shown in FIG. 11 A. The sensors 5 and 6 are connected through lead wires 21 and 22, as described above, to a first discrimination circuit 100 in the controller 7 which is indicated in FIG. 11 A as encircled by a single-dot chain line. The first discrimination circuit 100 discriminates whether the outputs obtained from the sensors 5 and 6 are in a low state or in a high state. A signal in the low state is hereinafter designated by LS, and a signal in the high state is hereinafter designated by HS.

An output signal HS from the first discrimination circuit 100 is applied to a second discrimination circuit 200, and another output signal LS from the first discrimination circuit 100 is supplied to a comparison circuit 400 and a deceleration calculating circuit 500. The second discrimination circuit 200 has a construction similar to that of the first discrimination circuit 100.

In the case where the frequency of the output HS from the first discrimination circuit 100 is higher than 200 Hertz, output 200 HS from the second discrimination circuit 200 is the output HS itself. When the frequency of the output HS from the first discrimination circuit 100 is lower than 200 Hertz, the frequency of the output from the second discrimination circiut 200 is set at 200 Hertz.

The above-mentioned output of the second discrimination circuit 200 is applied to a modulation frequency generating circuit 301 and a simulated vehicle speed calculating circuit 302 included in a simulated vehicle speed generating circuit 300. Another output RQ of the second discrimination circuit 200 is of a kind informing a logic circuit 601 whether the output of the second discrimination circuit 200 is a signal of just 200 Hertz or one equal to the HS output from the first discrimination circuit 100.

The simulated vehicle speed generating circuit 300 comprises the modulation frequency generating circuit 301 and the simulated vehicle speed calculating circuit 302, and the output TF of the circuit 301 is applied to the circuit 302. One output PV of the simulated vehicle speed calculating circuit 302 is applied to the above-mentioned comparison circuit 400. Another output $S\overline{Q}$ of the circuit 302 is applied to the logic circuit 601 to provide information as to whether the speed represented by the output PV is equal to or greater than a speed represented by the output 200 HS of the second discrimination circuit 200.

The comparison circuit 400 compares the speed signified by the output PV with the speed represented by the output LS of the first discrimination circuit 100, and delivers either one of the following two outputs to the logic circuit 601.

One output TQ indicates whether the speed represented by the output LS is greater or smaller than 80% of the speed represented by the output PV, and the other output WQ indicates whether the speed represented by the former output LS is greater or smaller than 40% of the speed represented by the latter output PV.

The deceleration calculating circuit 500, mentioned hereinbefore, differentiates the output LS from the first discrimination circuit 100 into binary coded outputs P1, P2, P3, P4, P5, and P6, all of which are transferred to a correction circuit 603. Simultaneously, the logic circuit 601 exercises a judgement over the above-mentioned outputs RQ, $S\overline{Q}$, TQ, and WQ, and delivers one of the following outputs.

1. An output K1 obtained when the frequency of the output 200 HS is 200 Hertz and that of the output PV is also 200 Hertz. Otherwise, the output K1 is also delivered when the shpeed represented by the output LS is greater than 80% of the speed represented by the output PV (the slip of the wheels being less than 20%);

2. An output K2 obtained when the speed represented by the output LS is in a range of from 40 to 80% of the speed represented by the output PV (the slip of the wheels being in a range of from 20 to 60%); and 3. An output K3 obtained when the speed represented by the output LS is less than 40% of the speed represented by the output PV (the slip of the wheels being greater than 60%).

The output K1, K2, or K3 is applied to the correction circuit 603, and depending on which of the outputs is received therein, the zero level for the outputs P1, P2, ... P6 is corrected. For instance, when the output K1 is received, the zero level of deceleration, that is the zero level of P1, P2, ..., P6 is corrected to −3G (deceleration is designated by +, and acceleration is disignated by −), and when the output K2 is received, the zero level of the outputs P1, P2, ..., P6 is corrected to OG. Likewise, when the output K3 is received, the zero level of the outputs is corrected to +3G.

In the ordinary running state of a vehicle (not braked), deceleration of the vehicle is OG, and the slip thereof is also zero. Since the output K1 is received in this case, the deceleration is corrected to −3G which means that an acceleration is to be applied.

The outputs RP of the correction circuit 603 are of the binary form and thereafter applied to a digital-analog conversion circuit (hereinafter called a simple D-A circuit) 602. When the output RP from the correction circuit 603 has a positive value, the output voltage VD from the D-A circuit 602 is elevated at a speed corresponding to the positive value, and, when the output RP shows a negative value, the output voltage VD is lowered at a speed corresponding to the negative value. The output voltage VP thus obtained is applied to a current amplification circuit 700. It should be noted that the lowest limit of the output voltage VC is the ground potential. The output of the current amplifier circuit 700 is connected to the servo valve 8 through a lead wire 23, whereby the servo valve 8 controls the pressure of the brake oil applied to the wheel cylinders 3 and 4. The servo valve 8 is also grounded through a lead wire 24.

The first discrimination circuit 100 will now be described in more detail with reference to FIG. 12. In the circuit 100, the output of the sensor 5 provided for the right rear wheel is connected to an amplifier A1, and the output of the amplifier A1 is connected to a monostable multivibrator M1. The output of the monostable multivibrator M1 is connected to NAND elements N1 and N4, an input T of a flip-flop F1, and input terminals R of flip-flops F3 and F4.

On the other hand, the output of a sensor 6 provided for the left rear wheel is connected to another amplifier A2, and the output thereof is further connected to another monostable multivibrator M2. The output of the monostable multivibrator M2 is further connected to NAND elements N2 and N5, an input T of a flip-flop F3, and input terminals R of flip-flops F1 and F2. Q output of the flip-flop F1 is connected to T input of the flip-flop F2, and Q output of the flip-flop F3 is connected to T input of the flip-flop F4. $\overline{Q}$ outputs from the flip-flops F2 and F4 are connected to inputs R and S of a reset-set flip-flop RF1, respectively.

$\overline{Q}$ output of the reset-set flip-flop RF1 is connected to other inputs of the NAND elements N2 and N4, and Q output of the reset-set flip-flop RF1 is connected to other inputs of the NAND elements N1 and N5. The outputs of the NAND elements N1 and N2 are connected to the inputs of a NAND element N3, and the outputs of the NAND elements N4 and N5 are connected to the inputs of a NAND element N6. The NAND element N3 delivers an output LS, and the NAND element N6 delivers an output HS.

The second discrimination circuit 200 is indicated in more detail in FIG. 13. An oscillator OS 11 oscillates at 200 Hertz, and the output thereof is connected to a monostable multivibrator M 11. The output of the multivibrator M 11 is further connected to an input of a NAND element N11, an input terminal T of a flip-flop F11, and input terminals R of flip-flops F13 and F14. On the other hand, the output HS of the NAND element N6 in FIG. 12 is connected to an input of a NAND element N12, an input terminal T of a flip-flop F13, and input terminals R of flip-flops F11 and F12.

Outputs Q,Q of the flip-flops F11 and F13 are connected to input terminals T, T of the flip-flops F12 and F14, and outputs $\overline{Q}, \overline{Q}$ of the flip-flops F12 and F14 are connected to input terminals R and S of a set-reset flip-flop RF11. The $\overline{Q}$ output of the set-reset flip-flop RF11, which is designated by RQ, is connected to another input of the NAND element N11, and the Q output from the set-reset flip-flop RF11 is connected to another input of the NAND element N12. The output of the NAND element N11 and the output of the NAND element N12 are connected to the input terminals of a NAND element N13, and the output of the NAND element N13 constitutes the output 200 HS of the circuit 200.

Figure 14:
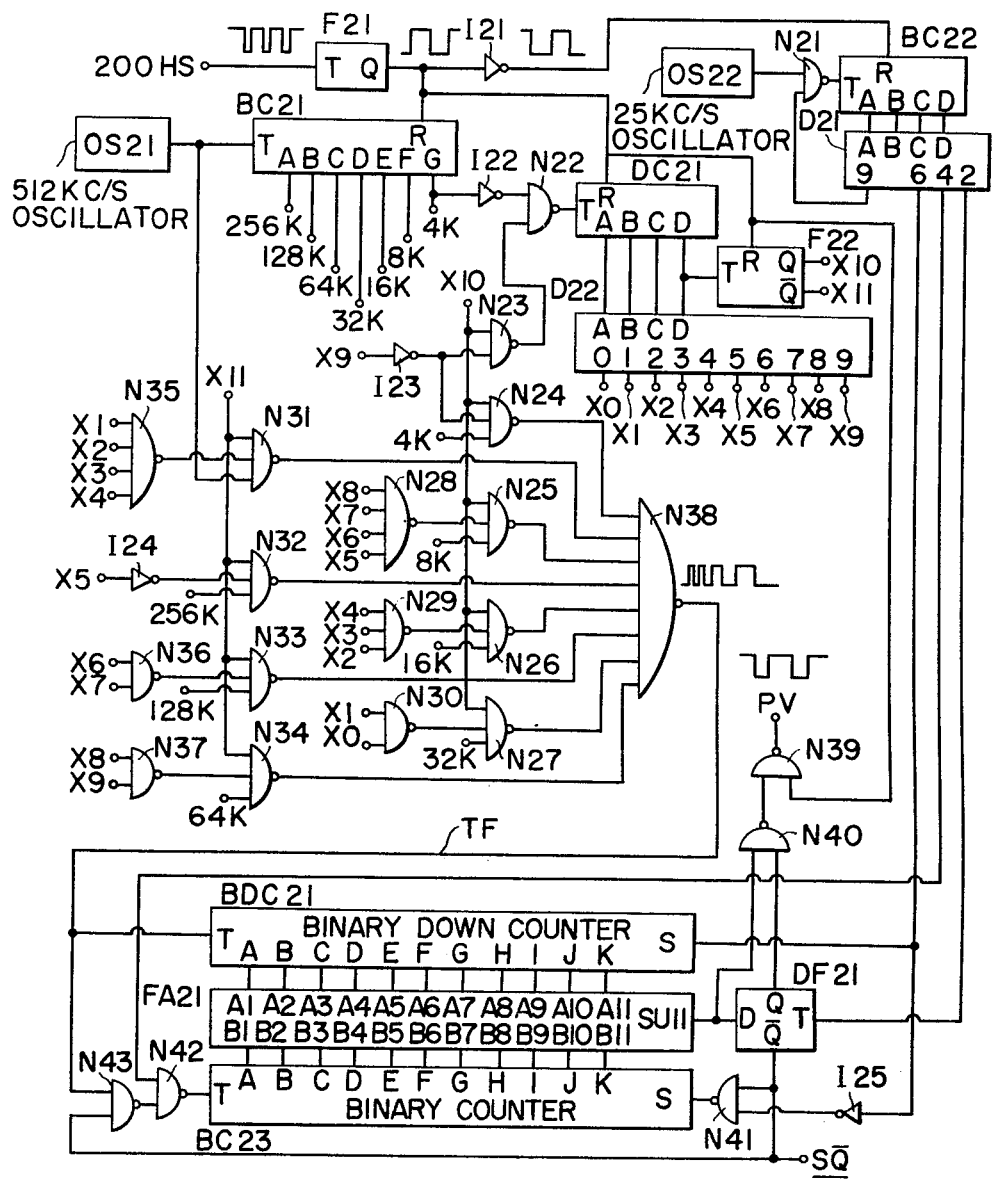
FIG. 14 is a circuit diagram showing a vehicle speed simulating circuit according to the invention for use in the anti-skid shown in FIG. 10.

The simulated vehicle speed generating circuit 300 is organized as shown in FIG. 14.

The circiut 300 includes a modulation frequency generating circuit 301 and a simulated vehicle speed calculating circuit 302 as described hereinbefore. The modulation frequency generating circuit 301 comprises an oscillator OS 21, a binary counter BC21, a decimal counter DC21, a decoder D22, a flip-flop F22, invertors I22, I23, and I24, and NAND elements N22 through N38. On the other hand, the simulated vehicle speed calculating circuit 302 comprises an oscillator OS22, binary counters BC22 and BC23, a decoder D21, a binary down counter BC21, a full-adder FA21, a D type flip-flop DF21, invertors I21 and I25. and NAND elements N21 and N39 through N43.

The oscillator OS 21 is oscillated at 512 Kilo-Hertz, and the output thereof is applied to an input T of the binary counter BC21 and to an input of the NAND element N31. An output designated by 256 K delivered from an output terminal A of the binary counter BC21 is connected to an input of the NAND element N32, another output 128 K from an output terminal B of the same counter is connected to an input of the NAND element N33, and still another output 64 K from a terminal C is connected to an input of the NAND element N34. Likewise, an output 32 K from a terminal D is connected to an input of the NAND element N27; an output 16 K from a terminal E is connected to an input of the NAND element N26; an output 8 K from a terminal F is connected to an input of the NAND element N25; and an output designated by 4 K obtained from a terminal G of the binary counter BC 21 is connected to an input of the NAND element N 24 and also to the input of the inverter I 22.

The output 200 HS from the NAND element N13 of the second discrimination circuit 200 is connected to an input T of the flip-flop F21, and the Q output of the same flip-flop F21 is connected to the input terminal of the inverter I21, the R input of the binary counter BC21, the R input of the decimal counter DC21, the R input of the flip-flop F22, and an input terminal of the NAND element N39. The output of the invertor I22 is connected to an input of the NAND element N22, and the output thereof is connected to an input T of the decimal counter DC21. An output from the terminal A of the decimal counter DC21 is connected to the A terminal of the decoder D22; an output from the terminal B of the former is connected to the B terminal of the latter, and so forth; and the output from the terminal D of the former is connected to the D terminal of the latter and also to the T terminal of the flip-flop F22.

An output XO from the output terminal "O" of the decoder D22 is connected to an input of the NAND element N30; an output X1 from the output terminal "1" of the decoder D22 is connected to an input of each of the NAND elements N35 and N30; likewise an output X2 is connected to an input of each of the NAND elements N35 and N29; an output X3 is connected to inputs of the NAND elements N35 and N29, respectively; an output X4 is connected to inputs of NAND elements N35 and N29; and so forth as clearly seen in FIG. 14.

The Q output of the flip-flop F22, which is designated by X10, is connected to an input of each of the NAND elements N23, N24, N25, N26, and N27. The $\overline{Q}$ output of the same flip-flop F22, which is designated by X11, is connected to an input of each of the NAND elements N31, N32, N33, and N34. The output of the NAND element N35 is connected to an input of the NAND element N31; the output of the invertor I24 is connected to an input of the NAND element N32; the output of the NAND element N36 is connected to an input of the NAND element N33; the output of the NAND element N37 is connected to an input of the NAND element N34; the outupt of the invertor I23 is connected to inputs of the NAND elements N23 and N24; the output of the NAND element N28 is connected to an input of the NAND element N25; the output of the NAND element N29 is connected to an input of the NAND element N26; and the output of the NAND element N30 is connected to an input of the NAND element N27. The output of the NAND element N23 is connected to an input of the NAND element N22. Furthermore, the outputs of the NAND elements N24, N25, N26, N27, N31, N33, and N34 are connected to inputs of the NAND element N38 which produces an output TF.

The output of the oscillator OS22 is connected to an input of the NAND element N21, and the output of the NAND element N21 is connected to an input T of the binary counter BC22. The output of the invertor I21 is connected to an input R of the binary counter BC22. Outputs A, B, C and D from the binary counter BC22 are connected to input terminals A, B, C, and D of the decoder D21, respectively.

An output from the terminal "9" of the decoder D21 is connected to another input of the NAND element N21, and an output from the terminal "6" of the same decoder D21 is connected to an input terminal S of the binary down counter BDC21 and also to an input of the invertor I25. An output from the terminal "4" of the decoder D21 is connected to an input of the NAND element N42, and an output from the terminal "2" of the same decoder D21 is connected to an input T of the D type flip-flop DF21.

The output TF of the NAND element N38, which corresponds to the output from the modulation frequency generating circuit 301 in FIG. 11 A is connected to an input T of the binary down counter BCD21 and to an input of the NAND element N43. The output of the NAND element N43 is connected to an input of the NAND element N42, and the output of the NAND element N42 is connected to an input T of the binary counter BC23. Outputs A, B, C, D, E, F, G, H, I, J, and K from the binary down counter BDC21 are connected to inputs A1, A2, A3, A4, A5, A6, A7, A8, A9, A10, and A11 of the full adder FA21, and outputs A, B, C, D, E, F, G, H, I, J, and K of the binary counter BC23 are connected to B1, B2, B3, B4, B5, B6, B7, B8, B9, B10, and B11 of the full adder FA21.

The output SU11 from the full-adder FA21 is connected to an input of the NAND element N40 and also to D input of the D type flip-flop DF21. The Q output of the D type flip-flop DF21 is connected to an input of the NAND element N40, and the Q output, which is made into $\overline{SQ}$, is connected to an input of the NAND element N41 and also an input of the NAND element N43. The output of the inverter I25 is connected to an input of the NAND element N41, and the output thereof is connected to an input S of the binary counter BC23. The output of the NAND element N40 is connected to an input of the NAND element N39, and the output thereof, designated by PV, represents the simulated vehicle speed.

Figure 15:
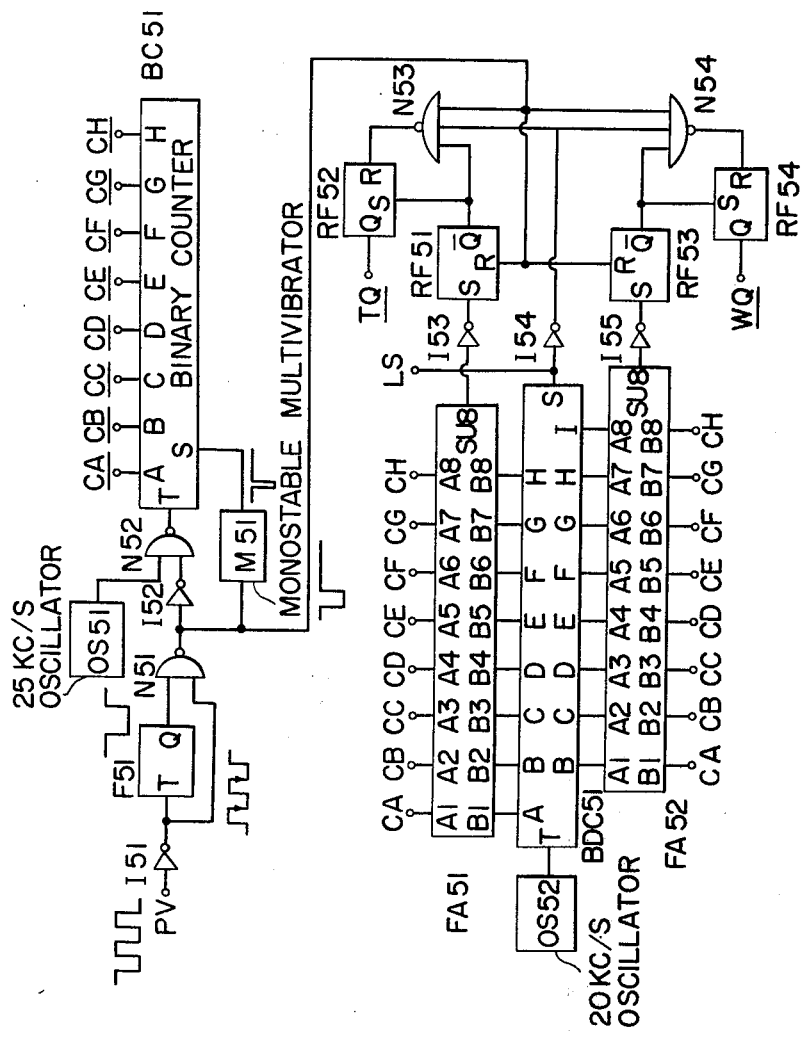
FIG. 15 is a circuit diagram showing an electrical comparison circuit according to the invention for use in the anti-skid device shown in FIG. 10.

In FIG. 15, thus is indicated a comparison circuit 400, wherein the simulated vehicle speed PV is connected to the input of an inverter I51, and the output thereof is connected to an input T of a flip-flop F51 and also to an input of a NAND element N51. The Q output of the flip-flop F51 is connected to another input of the NAND element N51. The output of the NAND element N51 is connected to the inputs of an invertor I52, a monostable multivibrator M51, and NAND elements N53 and N54, and to R inputs of set-reset flip-flops RF51 and RF53.

The output of the monostable multivibrator M51 is connected to an input S of a binary counter BC51. The output of the inverter I52 is connected to an input of a NAND element N52, and the output of an oscillator OS51, which is oscillated at 25 KC, is connected to another input of the NAND element N52. The output of the NAND element N52 is connected to an input T of the binary counter BC51. The binary counter BC51 deliver output signals CA, CB, CC, ..., CH from the output terminals A, B, C, ..., and H. The output signals CA, CB, CC, ..., and CH are connected to input terminals A1, A2, A3, ... , and A8 of a full adder FA51, respectively, and also to input terminals B1, B2, B3, ...., and B8 of another full adder FA52, respectively.

Another oscillator OS52, which is oscillating at a frequency of 20 KC, is connected to an input T of a binary down counter BDC51 made of a plurality of flip-flops. The output A of the binary down counter BDC51 is connected to an input B1 of the full-adder FA51, the output B of the binary down counter BDC51 is connected to an input B2 of the full adder FA51 and also to an input A1 of the full adder FA52, the output C of the binary down counter BDC51 is connected to an input B3 of the full adder FA51 and also to an input A2 of the full adder FA52, and so forth, and, lastly, the output I of the binary down counter BDC51 is connected only to an input A8 of the full adder FA52. The hereinbefore described output LS from the first discrimination circuit 100 is connected to an input S of the binary down counter BDC51 and also to the input of an inverter I54, and the output of the latter is connected to inputs of NAND elements N53 and N54.

The output SU8 of the full adder FA51 is connected through an inverter I53 to an input S of a set-reset flip-flop RF51, and the output SU8 of the full-adder FA52 is connected through another inverter I55 to an input S of a set-reset flop-flop RF53. The $\overline{Q}$ output of the set-reset flip-flop RF51 is connected to an input S of a set-reset flip-flop RF52, and also to an input of a NAND element N53, and the Q output of the set-reset flip-flop RF53 is connected to an input S of another set-reset flip-flop RF54, and also to an input of a NAND element N54. The output of the NAND element N53 is connected to an input R of the set-reset flip-flop RF52, and the output of the NAND element N54 is connected to an input R of the set-reset flip-flop RF54. The Q output of the flip-flop RF52 is designated by TQ, and the Q output of the flip-flop RF54 is designated by WQ.

Figure 16:
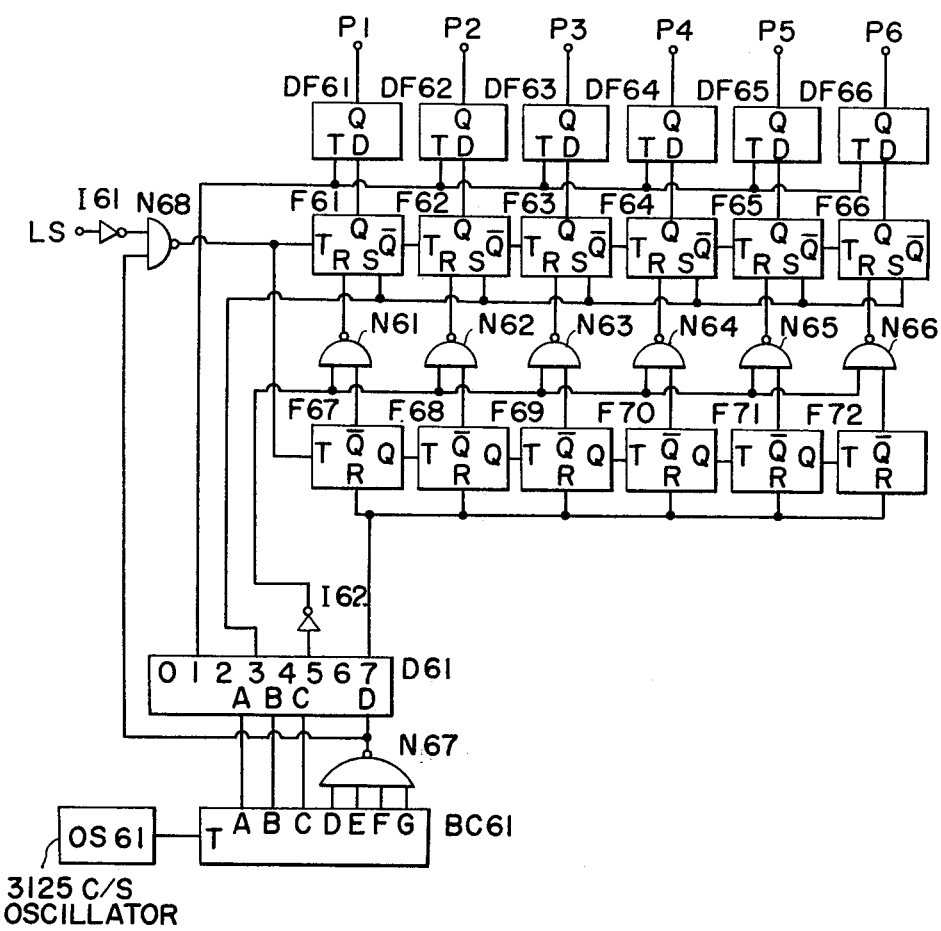
FIG. 16 is a circuit diagram showing a deceleration circuit according to the invention for use in the anti-skid device shown in FIG. 10.

Referring to FIG. 16, there is indicated a detailed organization of the deceleration calculating circuit 500. The circuit 500 includes an oscillator OS61 which oscillates at 3125 C/S. The output of the oscillator OS61 is connected to an input T of a binary counter BC61, and outputs A, B, and C of the binary counter BC61 are connected to inputs A, B, and C of a decoder D61, respectively. The remaining outputs D, E, F, and G of the binary counter BC61 are connected to input terminals of a NAND element N67. The output of the NAND element N67 is connected to an input D of the decoder D61, and also to an input of a NAND element N68. The output from the terminal "1" of the decoder D61 is connected to input terminals T of D type flip-flops DF61, DF62, DF63, ..., DF66. The output from the terminal "3" of the decoder D61 is connected to input terminals S of flip-flops F61, F62, F63, ..., F66. Likewise, the output from the terminal "5" of the decoder D61 is connected through an inverter I62 to an input of NAND elements N61, N62, N63, ..., N66.

Furthermore, the output from the terminal "7" of the decoder D61 is connected to input terminals R of flip-flops F67, F68, F69, ..., F72. The output LS from the hereinbefore described first discrimination circuit 100 is connected through an invertor I61 to an input of the NAND element N68. The output of the NAND element N68 is connected to inputs T of flip-flops F61 and F67. A binary down counter is composed of flip-flops F61, F62, F63, ..., F66, and the $\overline{Q}$ output of each flip-flop is connected to T input of the subsequent flip-flop.

A binary counter is composed of flip-flops F67, F68, F69, ..., F72, and the Q output of each flip-flop is connected to the T input of the succeeding flip-flop. The $\overline{Q}$ outputs of the flip-flops F67, F68, F69, ..., F72 are connected to an input of respective NAND elements N61, N62, N63, ..., N66, and the outputs from the NAND elements N61, N62, N63, ..., N66 are connected to R inputs of the flip-flops F61, F62, F63, ..., F66. The Q outputs from the flip-flops F61, F62, F63, ..., F66 are connected to the D inputs of D type flip-flops DF61, DF62, DF63, ..., DF66, respectively. Q outputs from the D type flip-flops DF61, DF62, DF63, ..., DF66 constitute the hereinbefore described binary coded outputs P1, P2, P3, P4, P5, and P6 of the deceleration calculating circuit 500.

Figure 17A:
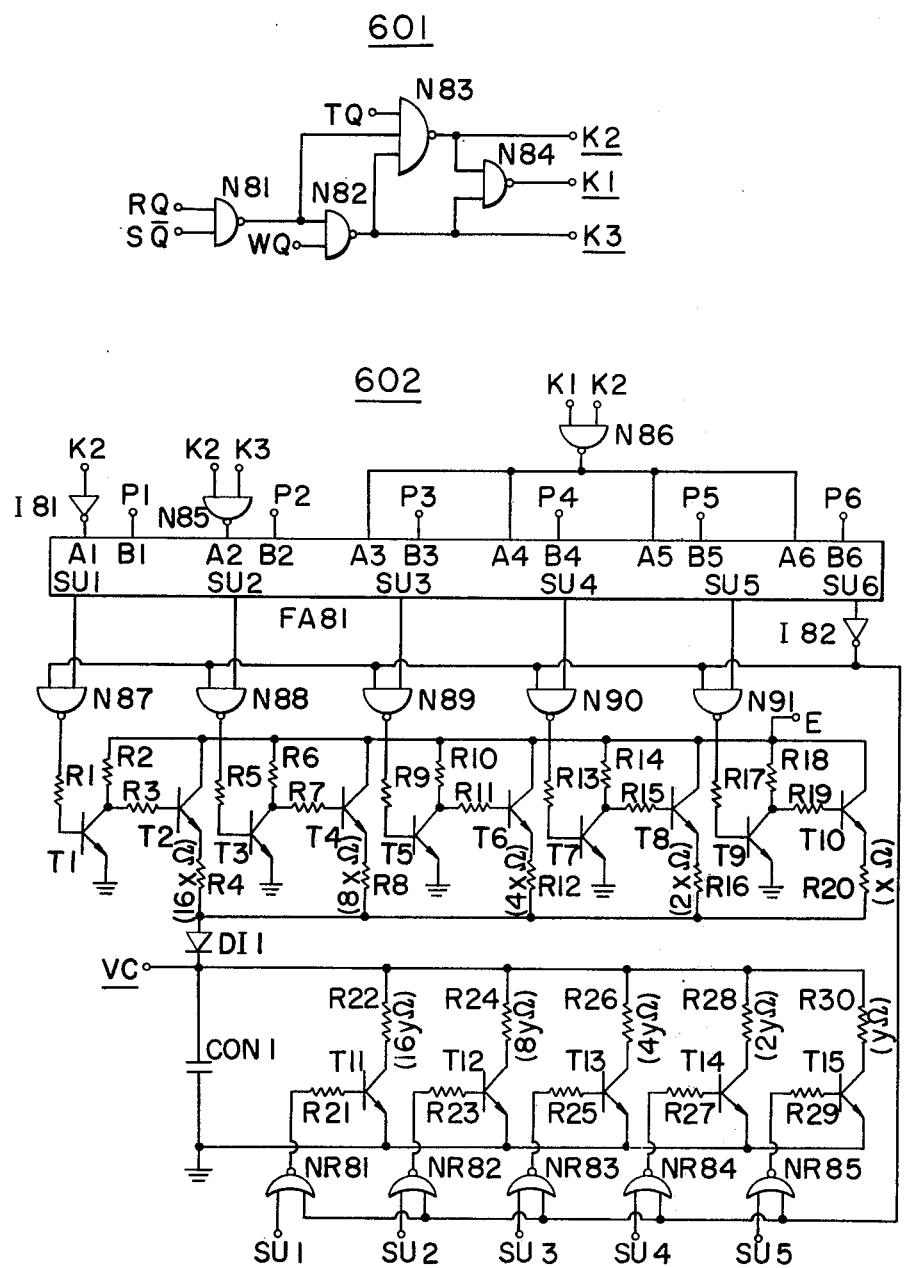
FIG. 17A is a circuit diagram showing a logic circuit according to the invention for use in the same device.

The hereinbefore-mentioned logic circuit 601, D-A conversion circuit 602, and correction circuit 603 will now be described in detail with reference to FIG. 17A.

The logic circuit 601 is composed of NAND elements N81, N82, N83, and N84. The D-A conversion circuit 602 comprises an inverter I82, NAND elements N87, N88, N89, ..., N91; NOR elements NR81, NR82, NR83, ..., NR85; resistors R1 through R30; NPN type transistors T1, T2, T3, ..., T15; a diode DI1; and a capacitor CON1. The correction circuit 603 is composed of an inverter I81, NAND elements N85 and N86, and a full-adder FA81.

The output RQ of the hereinbefore described second discrimination circuit 200 shown in FIG. 13 is connected to one input terminal of the NAND element N81, and the output $S\bar{Q}$ from the simulated vehicle speed calculation circuit 302 in FIG. 14 is connected to another input terminal of the NAND element N81. The output of the NAND element N81 is connected to an input of the NAND element N82 and also to an input of the NAND element 83. The outputs WQ and TQ of the comparision circuit 400 are connected to another input of the NAND elements N82 and N83. The NAND elements N83 and N82 deliver outputs K2 and K3, respectively, and the outputs K2 and K3 are connected to two inputs of the NAND element N84. The NAND element N84 delivers the output K1.

The output K1 is connected to an input of the NAND element N86, while the output K2 is connected to the inverter I81 and an input of the NAND elements N85 and N86. The output K3 is connected to an input of the NAND element N85. The output of the inverter I81 is connected to an input A1 of the full-adder FA81, the output of the NAND element N85 is connected to an input A2, and the output of the NAND element N86 is connected to inputs A3 through A6 of the full-adder FA81.

Furthermore, the outputs P1 through P6 from the deceleration calculating circuit 500 are connected to input terminals B1 through B6 of the full-adder FA81, respectively. The outputs SU1, SU2, SU3, SU4, SU5, and SU6 of the full-adder FA81 constitute the output RP of the correction circuit 603, within which the outputs SU1 through SU5 are connected to one input of the NAND elements N87 through N91, and also to one input of each of the NOR elements through NR85, respectively, while the output SU6 is connected to the inverter I82. The output of the inverter I82 is connected to another input of each of the NAND elements N87 through N91, and also to another input of the NOR elements NR81 through NR85.

The output of the NAND element N87 is connected to the base of the transistor T1 through the resistor R1, and the collector of the transistor T1 is connected through the resistor R2 to a terminal E, to which the positive electrode of a power source (not shown) is connected. The negative electrode of the power source is connected directly to the ground. The collector of the transistor T1 is further connected through the resistor R3 to the base of the second transistor T2, and the emitter of the transistor T1 is connected to the ground. The emitter of the transistor T2 is connected through the resistor R4 to the anode of the diode DI1, and the collector of the transistor T2 is connected directly to the terminal E. The output of the NAND element N88 is connected to the base of the third transistor T3 through the resistor R5, and the collector thereof is connected through the resistor R6 to the terminal E, and also through the resistor R7 to the base of the fourth transistor T4. The emitter of the transistor T3 is connected directly to the ground, while the collector of the transistor T4 is directly connected to the terminal E. The emitter of the transistor T4 is connected through the resistor R8 to the anode of the diode DI1.

Furthermore, the output of the NAND element N89 is connected through the resistor R9 to the base of the transistor T5, while the collector thereof is connected through the resistor R10 to the terminal E, and also through the resistor R11 to the base of the transistor T6. The emitter of the transistor T6 is connected through the resistor R12 to the anode of the diode DI 1. Likewise, the output of the NAND element N90 is connected through the resistor R13 to the base of the transistor T7, and the collector thereof is connected through the resistor R14 to the terminal E and through the resistor R15 to the base of the transistor T8. The emitter of the transistor T8 is connected through the resistor R16 to the anode of the diode DI 1. The output of the NAND element N91 is connected through the resistor R17 to the base of the transistor T9, and the collector thereof is connected through the resistor R18 to the terminal E and also through the resistor R19 to the base of the transistor T10. The emitter of the transistor T10 is connected through the resistor R20 to the anode of the diode DI 1. It should be noted that the emitters of the transistors T1, T3, T5, T7, and T9 are connected directly to the ground, and the collectors of the transistors T2, T4, T6, T8, and T10 are connected directly to the terminal E.

The output of the NOR element NR 81 is connected through the resistor R21 to the base of the transistor T11, and the collector thereof is connected through the resistor R22 to the cathode of the diode DI 1 which is connected to one terminal of the capacitor CON 1. The output of the NOR element NR 82 is connected through the resistor R23 to the base of the transistor T12, and the collector thereof is connected through the resistor R24 to the cathode of the diode DI 1.

In a similar manner, the outputs of the NOR elements NR 83 through NR 85 are connected through the resistors R25, R27, and R29 to the bases of the transistors T13, T14, and T15, and the collectors thereof are connected through resistors R26, R28, and R30 to the cathode of the diode DI 1, respectively, which is connected with one terminal of the capacitor CON 1. The emitters of the transistors T11, T12, T13, T14, and T15 are connected directly to the other terminal of the capacitor CON 1 which is in turn connected to the ground.

In the above described arrangement, for instance, the resistor R20 is assumed to be X ($\omega$), the resistance values of the resistors R16, R12, R8, and R4 are set at 2X, 4X, 8X, and 16X ($\omega$), respectively. Likewise, when the resistor R30 is assumed to be Y ($\omega$), for instance, the resistance values of the resistors R28, R26, R24, and R22 are set at 2Y, 4Y, 8Y, and 16y ($\omega$), respectively. The voltage at the first terminal of the capacitor CON 1, to which the cathode of the diode DI 1, the resistors R22, R24, R26, R28, and R30 are connected, constitutes the output VC of the D-A conversion circuit 602.

The current amplifier circuit 700 amplifies the output VC proportional thereto and applies the output to the servo valve 8 through a lead wire 23. Since the circuit is well known, detailed description thereof will be omitted.

Figure 18:
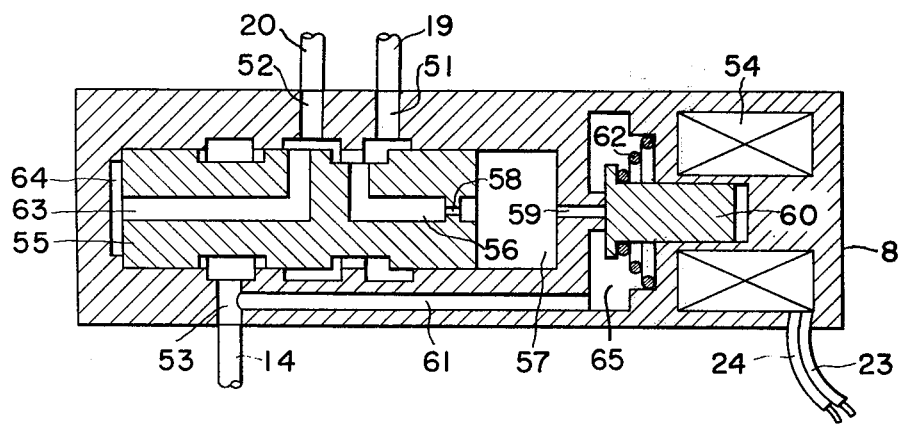
FIG. 18 is a sectional view of a servo valve used in one part of the anti-skid brake controlling device shown in FIG. 10.

Referring now to FIG. 18, there is illustrated an example of the servo valve which has three ports 51, 52, and 53. The port 51 is coupled through the conduit 19 to the hereinbefore described control valve 9, while the port 52 is coupled through the conduit 20 to the wheel cylinders 3 and 4, and the port 53 is coupled to the drain 13 through the conduit 14. The servo valve 8 further includes an operational coil 54 one terminal of which is connected through the lead wire 23 to the current amplifier circuit 700 as described above. The other terminal of the operational coil 54 is connected through a lead wire 24 to the ground.

The flow resistance between the ports 51 and 52 and the flow resistance between the ports 52 and 53 are varied when the position of a spool valve 55 is varied. That is, when the spool valve 55 is displaced rightward in FIG. 18, the flow resistance of the fluid between the ports 51 and 52 becomes high, and the flow resistance between the ports 52 and 53 becomes low.

On the contrary, when the spool valve 55 is displaced leftward as shown in FIG. 18, the flow resistance of the fluid between the ports 51 and 52 becomes low while the flow resistance between the ports 52 and 53 becomes high.

The port 51 communicates through a passage 56 and an orifice 58, both provided in the spool valve 55, to a chamber 57. The chamber 57 in turn communicates through a passage 59 with another chamber 65. A plunger 60 is urged leftwardly by a spring 62, provided between a flange portion of the plunger 60 and a rightward end wall of the chamber 65, so that the passage 59 is thereby blocked.

When the coil 54 is energized, the plunger 60 is displaced toward the right against the resilient force of the spring 62. The port 52 thus communicates with a chamber 64, provided at the leftward end of the servo valve 8, through a passage 63 provided through the spool valve 55.

The apparatus shown in FIGS. 10, 11A, 12 through 16, 17A, and 18 operates as follows.

Referring first to FIG. 10, the hydraulic pump 12 is driven by, for instance, an engine (not shown) in the motor vehicle, and pressurizes the fluid supplied from the drain 13 through the conduit 16. The fluid thus pressurized is sent through the conduit 17, check valve 11, and the conduit 18 to the accumulator 10 wherein the fluid thus pressurized is stored. The check valve 11 is provided for preventing reverse flow of the pressurized fluid from the accumulator back to the pump 12 even at instants when the delivery pressure of the pump 12 becomes lower than the pressure of the accumulator 10.

The control valve 9 receives the pressurized fluid from the accumulator 10 through the conduit 18, and allows one part of the pressurized fluid to flow to the drain 13 through the conduit 15. Thus, the control valve 9 creates a pressurized fluid in the conduit 19, the pressure thereof corresponding to the stepping force on the brake pedal 9a.

On the other hand, the output pulses from the sensors 5 and 6 are delivered through lead wires 21 and 22 to the controller 7 as described hereinbefore. However, the controller 7 delivers no output to the servo valve 8 through the lead wire 23 whenever the wheels of the vehicle are not in the locked state. In this case, the servo valve 8 conveys the fluid pressure in the conduit 19 to the conduit 20 without any variation, whereby the pressure corresponding to the stepping force on the brake pedal 9a is applied to the wheel cylinders 3 and 4.

When the wheel speed is reduced to an extent such that the wheels 1 and 2 are nearly locked, the controller 7 delivers over the lead wire 23 a current of a magnitude in accordance with the degree to which the wheels approach the locked state. The servo valve 8 by-passes a part of the fluid pressure in the conduit 19 to the drain 13, whereby the fluid pressure in the output conduit 20 is reduced from the fluid pressure in the conduit 19 by an amount corresponding to the output current supplied through the lead wire 23. The fluid pressure in the output conduit 20 thus reduced is applied to the wheel cylinders 3 and 4, whereby the brake is operated at a braking pressure which is not sufficiently high to cause the wheels to be brought into the locked state. That is, the controller 7 controls the current in the lead wire 23 so that the servo valve 8 adjusts the braking fluid pressure applied to the wheel cylinders 3 and 4 to a valve preventing locking of the wheels.

The operation of the above-mentioned controller 7, in which all of the electrical circuits hereinbefore described are included, will now be described in more detail.

Referring again to FIG. 12 showing the first discrimination circuit 100, an input from the sensor 5 associated with the right rear wheel is amplified in the amplifier A1 and thereby made into a pulse form. The high-potential level of a pulse is called the H state and the low-potential level of the pulse is called the low state L. The monostable multivibrator M1 produces an output pulse, which is changed from the high state H to the low state L and held therein for a very short period, when the output from the amplifier A1 is transferred from the H state into the L state. Likewise, the monostable multivibrator M2 produces an output pulse, which is transferred from the H state into the L state and held therein for a very short period, in response to the output from the sensor 6 for the left rear wheel. The flip-flops F1, F2, F3, and F4 are assembled into a binary counter, and when the R input of each of the flip-flops is in the L state, the Q output thereof is brought into the L state while the $\overline{Q}$ output thereof is brought into the H state. Furthermore, when input T of each flip-flop is transferred from the H state into the L state, the Q output is transferred from the L state into the H state or from the H state into the L state, and the $\overline{Q}$ output thereof is transferred in a complementary manner. However, in the case where the S and R inputs of a set-reset flip-flop are both in the L state, the Q and $\overline{Q}$ outputs are both in the H state.

When the output of the monostable multivibrator M1 is changed from the H state to the L state, the Q output of the flip-flop F1 is reversed. However, the flip-flops F3 and F4 are reset at that time, and the Q output of the flip-flop F3 assumes the L state, while the $\overline{Q}$ output of the flip-flop F4 assumes the H state.

On the other hand, when the output from the monostable multivibrator M2 is transferred from the H state into the L state, the Q output of the flip-flop F3 is reversed, and the flip-flops F1 and F2 are reset so that the Q output from the flip-flop F1 is brought into the L state, while the $\overline{Q}$ output of the flip-flop F2 is brought into the H state.

For instance, when the flip-flops F1 and F2 are reset, and if a trigger input is first applied to the flip-flop F1, that is, if the T input is transferred from the H state into the L state, the Q output from the flip-flop F1 is brought into the H state, and the $\overline{Q}$ output of the flip-flop F2 is also brought into the H state. However, when a trigger input, that is, an input being changed from the H state into the L state is secondly applied to the flip-flop F1 after the flip-flops F1 and F2 are once reset, the Q output of the flip-flop F1 and the $\overline{Q}$ output from the flip-flop F2 are brought into the L state. In other words, after the application of an L pulse (short period of the L state) to the R terminals of the flip-flop F1 and F2, if two successive L pulses as mentioned above are applied to the T terminal of the flip-flop F1 (that is, when the repetition frequency of the output from the multiamplifier M1 is higher than that of the multivibrator M2), the $\overline{Q}$ output of the flip-flop F2 will be brought into the L state.

Likewise, if two successive L pulses as mentioned above are applied to the T input of the flip-flop F3 after the R inputs of the flip-flops F3 and F4 are once brought into the L state (that is, the repetition frequency of the output from the multivibrator M2 is higher than that of the multivibrator M1), the $\overline{Q}$ output of the flip-flop F4 is brought into the L state.

In the first-mentioned case where the $\overline{Q}$ output of the flip-flop F2 becomes L, the set-reset flip-flop RF1 is reset, whereby the Q output of the flip-flop RF1 becomes L and the $\overline{Q}$ output thereof becomes H. Thus, the output of the NAND element N1 assumes the H state because one input thereof is in the L state (the output of a NAND element becomes L only when all of the inputs thereof are in the H state). The output of the NAND element N2 becomes the exact reverse of the output of the monostable multivibrator M2 because one input thereof obtained from the $\overline{Q}$ output of the flip-flop RF1 is in the H state. Since one input of the NAND element N3 has been brought into the H state as described above, and the other input thereof is the exact reverse of the output of the monostable multivibrator M2, the output of the NAND element N3 will be the output of the multivibrator M2 itself, which is of a lower repetition frequency than that of the multivibrator M1.

Likewise, one input of the NAND element N4 is in the H state, and the other input thereof is the output of the monostable multivibrator M1, whereby the output from the NAND element N4 is the exact reverse of the output of the monostable multivibrator M1. Since one input obtained from the output $\overline{Q}$ of the flip-flop RF1 is L, the output of the NAND element N5 becomes H regardless of the other input thereof. Since one input of the NAND element N6 is in the H state, and the other input thereof is the exact reverse of the output of the monostable multivibrator M1, the output of the NAND element N6 will be the output of the monostable multivibrator M1 itself, which is of a higher repetition frequency. The above-mentioned condition will be held as it is even if the $\overline{Q}$ output of the flip-flop F2 is changed into the H state because the operational state of the set-reset flip-flop RE1 is thereby unchanged.

In the above-mentioned second case, wherein the repetition frequency of the output from the monostable multivibrator M2 is higher than that of the multivibrator M1, the $\overline{Q}$ output of the flip-flop F4 is brought into the L state as described before, and the set-reset flip-flop RF1 is set because the S input thereof is placed in the L state. Thus, the Q output of the flip-flop RF1 is brought into the H State, and the $\overline{Q}$ output thereof is placed in the L state.

One input of the NAND element N1 is thereby placed in the H state, and since the other input thereof is the output of the monostable multivibrator M1, the output of the NAND element N1 will be the exact reverse of the output of the monostable multivibrator M1. One input of the NAND element N2 is in the L state, and the output of the NAND element N2 is in the H state. Thus, one input of the NAND element N3 is in the H state, and the other input thereof is the exact reverse of the output of the monostable multivibrator M1, whereby the output of the NAND element N3 will be the output of the monostable multivibrator M1 itself, which is of a lower repetition frequency them that of the M2.

Since one input of the NAND element N4 is in the L state, the output of the NAND element N4 assumes the H state as described before. On the other hand, one input of the NAND element N5 is in the H state, and the other input thereof is the output of the monostable multivibrator M2, whereby the output of the NAND element N5 will become the exact reverse of the output of the monostable multivibrator M2. Thus, one input of the NAND element N6 is in the H state, and the other input thereof is the exact reverse of the monostable multivibrator M2, the output of the NAND element N6 becoming the output of the monostable multivibrator itself which is of a higher repetition frequency. This condition is held even if the $\overline{Q}$ output of the flip-flop F4 becomes H, and the Q output of the set-reset flip-flop RF1 is maintained in the H state and the $\overline{Q}$ output thereof is maintained in the L state.

Summarizing the above description, the output from a monostable multivibrator, the repetition frequency of which is lower than that of the other monostable multivibrator, is delivered from the NAND element N3, and the output from a monostable multivibrator, the repetition frequency of which is higher than that of the other monostable multivibrator, is delivered from the NAND element N6. The output of the higher repetition frequency is designated by HS, and that of the lower repetition frequency is dsignated by LS.

The output HS corresponds to an output from a wheelspeed sensor having a higher wheel speed, and hence the onecycle period thereof is shorter, while the output LS corresponds to an output from a wheel-speed sensor having a lower wheel speed, whereby the one-cycle period thereof is longer than the other.

The operation of the second discrimination circuit 200 will now be described in detail with reference to FIG. 13. The second discrimination circuit 200 includes an oscillator OS 11 which is operated, as one example, but not limitatively, at 200 c/s, this value corresponding to a wheel speed of about 10 km/h. The pulse train obtained from the oscillator OS 11 is formed in a monostable multivibrator M11 into a waveform having a comparatively short period for the L state and a comparatively long period for the H state, although the repetition frequency, 200 c/s, thereof is left unchanged.

In FIG. 13, the output HS delivered from the NAND element N6 in the first discrimination circuit 100 acts as if it were the monostable multivibrator M2, and the monostable multivibrator M11 acts as if it were the monostable multivibrator M1. The flip-flops F11, F12, F13, and F14 operate in a similar manner as the flip-flops F1, F2, F3, and F4 in FIG. 12, respectively. The set-reset flip-flop RF11 operates as the set-reset flip-flop RF1 in FIG. 12. Furthermore, the NAND elements N11, N12, and N13 operate in a similar manner as the NAND elements N4, N5, and N6 in FIG. 12.

Accordingly, the output from the NAND element N13 is such that when the input HS has a higher repetition frequency than 200 c/s, the input HS itself is delivered from the NAND element N13, but when the input HS has a lower repetition frequency than 200 c/s, the output of the monostable multivibrator M11 appears from the NAND element N13. The output of the above-mentioned second discrimination circuit 200 is designated by 200 HS.

Thus, it will be appreciated that the output 200 HS of the second discrimination circuit 200 represents a train of pulses obtained from a sensor associated with one of the rear wheels, the rotating speed of which is higher than that of the other, when the repetition frequency of the train of pulses of 200 c/sm and the output 200 HS represents a train of pulses of 200 c/s obtained from the oscillator OS11, when the train of pulses obtained from the sensor associated with a rear wheel of the higher rotating speed has a repetition frequency lower than the 200 c/s. The output RQ obtained from the $\overline{Q}$ output of the set-reset flip-flop RF11 is used for informing the logic circuit 601 whether the output 200 HS is merely the 200 c/s oscillation signal or whether it is equal to the input signal HS.

The operation of the simulated vehicle speed generating circuit 300 will now be described with reference to FIG. 14.

The frequency of the output 200 HS from the second discrimination circuit 200 is reduced to one half by the flip-flop F21. The oscillator OS21 generates a frequency of, for instance, 512 KC, and when the R input of the binary counter BC21 is in the H state, that is, when the Q output of the flip-flop F21 is in the H state, the output from the terminal A of the binary counter BC21 has a frequency of 256 KC, the output from the terminal B thereof has a frequency of 128 KC, and the output from the terminal C thereof has a frequency of 64 KC. Likewise, the frequencies of the outputs from the terminals D, E, F, and G are 32, 16, 8, and 4 KC, respectively. When the R input of the binary counter BC21 is in the L state, the binary counter BC21 is reset, and all outputs from the counter BC21 are in the L state. When the Q output from the flip-flop F21 is changed from L to H (in the worst case, an allowance corresponding to a one cycle period of 512 KC will be introduced), the outputs A, B, C, D, E, F, and G are delivered from the binary counter BC21.

The decimal counter DC21 and the flip-flop F22 count the 4 KC output from the binary counter BC21 when R inputs of the DC21 and F22 are in the H state, the outputs A, B, C, D of the decimal counter DC21 are converted in the decoder D22 into the corresponding decimal notation. That is, each of the outputs "0", "1", "2"..., "9" from the decoder D22 corresponds to a digit of a number expressed decimally, and when, for instance, "5" is in the L state, all of the rest of the outputs are in the H state. The outputs Q and $\overline{Q}$ of the flip-flop F22 in combination indicates the tens position of the decimal number. That is, the Q output in L and the $\overline{Q}$ output in H state indicates that the tens position of the number is 0, and the Q output in H and the $\overline{Q}$ output in L state indicates that the tens position of the number is 1.

For instance, when the $\overline{Q}$ output of the flip-flop F22 is in the L state and the output from the terminal "7" of the decoder D22 is in the L state, the number indicated is 17. Likewise, when the $\overline{Q}$ output of the flip-flop F22 is in the L state, and the output from the terminal "9" of the decoder D22 is in the L state, the number indicated is 19.

When the above-mentioned number 19 is counted, since the output X9 from the decoder D22, which is in L state, is applied to the NAND element N23 through the invertor I23, the two inputs of the NAND element N23 become H, whereby the output thereof is brought into the L state. Since an input of the NAND element N22 becomes L, the output of the NAND element becomes H, whereby the decimal counter DC21 stops counting of the 4 KC input. Thus, the decimal counter DC21 does not proceed with the counting operation but is held in the stopped state indicating the number 19.

When the Q output of the flip-flop F21 becomes L, the decimal counter DC21 and the flip-flop F22 are reset, and the Q output of the flip-flop F22 is changed from the H to L ($\overline{Q}$ output is changed from L to H), and the XO output from the decoder D22 is changed from H to L (the rest of the outputs are held in the H state), which means zero.

In the case where the zero output is obtained, the outputs from the NAND elements N24, N25, N26, N27, N31, N32, N33, and N34 are all brought into the H state, and the output TF of the NAND element N38 becomes L.

When the output means "1", two inputs of the NAND element N31 are brought into the H state, whereby the output of the NAND element N31 will be a train of pulses of 512 KC. Since other inputs of the NAND element N38 are all in the H state, the output TF of the NAND element N38 also becomes the pulse train of 512 KC. This relation is valid for the cases where the obtained decimal output is 2, 3, or 4, and in all of these cases, the output TF from the NAND element N38 is the pulse train of 512 KC.

In the case where the decimal output signifies 5, the output of the NAND element N32 is a train of pulses of 256 KC. Since all of other inputs of the NAND element N38 are in the H state, the output TF of the NAND element N38 is a pulse train of 256 KC.

Likewise, when the decimal output if 6 or 7, the output TF of the NAND element N38 becomes a pulse train of 128 KC, and when the decimal output is 8 or 9, the output TF of the NAND element N38 becomes a pulse train of 64 KC, and so forth. Thus, for the decimal outputs of 10 or 11; 12, 13, or 14; 15, 16, 17, or 18; and 19, the TF outputs of 32 KC; 16 KC; 8 KC; and 4 KC will be obtained, respectively, from the NAND element N38.

In the case where the Q output from the flip-flop F21 is in the H state, the output of the invertor I21 becomes L, whereby the binary counter BC22 is reset, and the outputs from the terminals A, B, C, and D of the binary counter BC22 are all brought into L state. When the Q output of the flip-flop F21 is brought into the L state, the binary counter BC22 counts the output pulses of, for instance, 25 KC obtained from the oscillator OS22 through the NAND element N21. The decoder D21 converts the counted results of the binary counter BC22 into decimal values. Ultimately, when the output delivered from the terminal "9" assumes the L state, an input of the NAND element N21 becomes L, whereby the output thereof is brought into the H state, and the counting operation of the binary counter BC22 is thereby terminated. At this time, the L state at the terminal "9" is held until the Q output of the flip-flop F21 is changed from the L state to the H state.

When the Q output from the flip-flop F21 has been changed from H to L as described above, if the output SU11 from the full adder FA21 applied to the D input terminal of the D type flip-flop DF21 is in the L state, and if the output "2" of the decoder D21 is changed from the H state to the L state, the L state at the terminal D will be shifted to the Q output of the D type flip-flop DF21, while the $\overline{Q}$ output will be brought into the H state. Since the Q output of the flip-flop F21 is in the L state, the output TF from the NAND element N38 is in the L state. Thus, one input of the NAND element N43 becomes L, and the output thereof is brought into the H state.

When the output "4" from the decoder D21 is changed from H to L and again to H, the output from the NAND element N42 is changed from L to H and again to L, whereby the binary counter BC23 counts one more pulse. When the output "6" of the decoder D21 is then brought into L, the binary down counter BDC21 is thereby set, whereby all outputs A, B, C, D, E, F, Q, H, I, J, and K thereof are brought into the H state (this H state is considered to be the zero state of the full adder).

On the other hand, the output of the inverter I25 is brought into the H state. Thus the two inputs of the NAND element N41 are brought into the H state, and the output thereof is caused to assume the H state. The binary counter BC23 is thus set, and all outputs A through K of the binary counter BC23 are brought into the H state (this condition is considered to be zero state). The full adder FA21 is always summing a binary number expressed by the outputs A through K of the binary down counter BDC21 to a binary number expressed by the outputs A through K of the binary counter BC23. If the summed result is positive, the output SU11 of the full adder FA21 will be brought into the L state, and if the summed result is zero or negative, the output SU11 of the full adder FA21 will be brought into the H state.

Thus, when the Q output of the flip-flop F21 is in the L state, all of the outputs from the binary down counter BDC21 are H expressing a value of zero, and all of the outputs from the binary counter BC23 are also H expressing also a value zero. Since the sum of these two values is also zero, the output SU11 of the full adder is in the H state. Since the other input of the NAND element N40 is in the L state, the output thereof becomes H. On the other hand, since one input of the NAND element N39 is L, the output thereof is brought into the H state.

In the case where the Q output of the flip-flop F21 is changed from the L state to the H state as described herein-before, the output TF of the NAND element N38 is successively changed from 512 KC through 256 KC, 128 KC, . . . , to 4 KC as described before, and the binary down counter BDC21 downcounts these output pulses. Since one input of the NAND element N43 is in the H state, the output of the N43 element is the exact reverse of the above-mentioned output TF from the NAND element N38. Furthermore, since one input of the NAND element N42 is in the H state, the output thereof will be just the output TF from the NAND element N38. Thus the binary counter BC23 counts the output TF of the NAND element N38.

The binary down-counter BDC21 down-counts the output TF sequentially as 0, −1, −2, . . . , −200, and the binary counter BC23 counts the output TF sequentially as 0, 1, 2, . . . , 200. Thus, all the sums of the corresponding positions of the outputs, in the binary form, from the binary down-counter BDC21 and the binary counter BC23 become zero, whereby the output SU11 from the full adder FA21 is brought into the H state. Since two inputs of the NAND element N39 are in the H state, the output PV from the NAND element N39 is in the L state. The speed represented by the period of the output PV kept in the L state is assumed to be the simulated vehicle speed.

When the Q output of the flip-flop F21 is again changed from the H state to the L state, the output TF from the NAND element N38 is brought into the L state, whereby the outputs from the binary down counter BDC21 present a binary coded number −200, and the outputs from the binary counter BC23 present a binary coded number +200. Accordingly, the output SU11 from the full adder FA21 is held in the H state. Thus, when the output "2" from the decoder D21 is changed from the H state to the L state and again to the H state, the Q output from the D type flip-flop DF21 is brought into the H state, and the $\overline{Q}$ output thereof assumes the L state. Thus, the output of the NAND element N39 is brought into the H state at an instant when the Q output of the flip-flop F21 assumes the L state.

Then, the output "4" from the decoder D21 is changed from the H state to the L state and again to the H state. The binary counter BC23 counts this one pulse as described before, and hence the output thereof is changed from +200 to +201 expressed in the binary code. The avove described change from +200 to +201 means a reduction of the vehicle speed.

It should be noted that the frequency of the output TF from the NAND element N38 has been changed sequentially from 512 KC to 256 KC, 128 KC, and so forth so that the deceleration of the vehicle speed is always maintained at approximately 1.2G even if the counted number in the binary counter BC23 is varied, for instance, from +200 to +201, +500 to +501, or from +700 to +701.

When the output "6" from the decoder D21 is changed from the H state to the L state and again to the H state, the binary down counter BDC21 is set to zero in the binary code. On the other hand, since one input of the NAND element N41 is in the L state, the output thereof becomes the H state, and hence the output of the binary counter BC23 is maintained at a value of +201 expressed in the binary code. Thus, the output SU11 from the full adder FA21 becomes the L state at the instant when the output of the binary counter BC23 becomes +201 because the sum of the counted results in the both counters BC23 and BDC21 is made positive. Thus, the output of the NAND element N40 is caused to assume the H state because one input thereof is L.

At this stage of the operation, if the Q output of the flip-flop F21 is again changed from the L state to the H state, one input of the NAND element N43 becomes L, whereby the output thereof is brought into the H state. Thus, two inputs of the NAND element N42 become H, and the output thereof is changed into the L state. The binary counter BC23 now stops its counting operation, and hence the output thereof is maintained at +201. On the other hand, the binary down counter BDC21 down-counts the output TF of the NAND element N38.

It is assumed that the period while the Q output of the flip-flop F21 is held in the H state is equal to a value allowing to down-count −210 in the binary down counter BDC21 (such a period corresponding to a somewhat slower vehicle speed than the previous −200). Then, while the binary down counter BDC21 down-counts the output TF of the NAND element N38 so that the output thereof is varied from 0 to −1, −2, . . . , −199, −200, −201, −202, . . . , the output from the full adder FA21 is held positive up to a time-instant when the output from the binary down counter BDC21 becomes −200, the output becomes zero when the output from the binary down counter BDC21 becomes −201, and the output of the full adder FA21 becomes negative when the output from the binary down counter BDC21 becomes −202.

Thus, the output SU11 of the full adder FA21 is in the L state until the binary output of the binary down counter BDC21 becomes −200, and it is changed into the H state from an instant the binary output of the binary down counter BDC21 is changed to −201. At this instant, both inputs of the NAND element N40 become H causing the output thereof to be changed into the L state. One input of the NAND element N39 is now in the L state, whereby the output thereof is changed into the H state. It should be noted that the output PV of the NAND element N39 is maintained in the L state only while the vehicle speed is maintained at a value corresponding to the binary output −200 of the binary down counter BDC21.

Since the output SU11 of the full adder FA21 is in the H state at this time, the binary coded output of the binary counter BC23 is increased to +202 when the Q output of the flip-flop F21 is again changed from the L state to the H state. Thus, the output of the NAND element N39 is held in the L state for a period corresponding to the vehicle speed represented by the output, −201, from the binary down counter BDC21. The L state of the output of the NAND element N39 is thereafter elongated successively in accordance with the variation of the output from the binary down counter BDC21 such as from −202 to −203, −204, and so forth. The deceleration of the vehicle, however, does not exceed 1.2G. The reason for this is that the frequency of the output TF from the NAND element N38 is also reduced.

On the contrary, if the period during which the Q output from the flip-flop F21 is in the H state is shortened to correspond, for instance, to −185 of the output obtained from the binary down counter BDC21, the sum obtained in the full adder FA21 becomes positive, whereby the output SU11 thereof is maintained in the L state. In this case, one input of the NAND element N40 becomes L, and the output thereof is brought into the H state. The output of the NAND element N39 is brought into the L state for a period corresponding to the period during which the Q output of the flip-flop F21 is maintained in the H state, and the above-mentioned period corresponds to the vehicle speed represented by the output −185 from the binary down counter BDC21. Since the output SU11 from the full adder FA21 is in the L state, the operation of the circuit is repeated returning back to the operational stage where the output SU11 was in the L state.

As will be apparent from the above described sequential operation, the duration of the L state in the output PV of the NAND element N39 is equal to or shorter than the duration of the H state in the Q output of the flip-flop F21 in the case where the frequency of the output 200 HS from the second discrimination circuit 200, which corresponds to the highest rotating speed of wheels, is higher than 200 c/s.

A vehicle speed represented by an L state in the output PV from the NAND element N39 is compared in the comparison circuit 400 with the vehicle speed represented by the preceding L state in the same output PV, so that the actual deceleration to be used for controlling the vehicle speed is thereby determined.

The operation of the comparison circuit 400 will now be described with reference to FIG. 15. The output PV from the NAND element N39 is applied to the inverter 151 so that the thus applied signal PV is thereby reversed, and the thus reversed output from the inverter 151 is thereafter applied to the input terminal T of the flip-flop F51 so that the frequency thereof is divided into one half. The frequency divided output from the flip-flop F51 is then applied to one input of the NAND element N51, and the output of the inverter 151 is applied to another input of the NAND element N51, so that the L states contained in the output of the NAND element N51 are removed alternately. It should be noted that the duration period of the L states in the thus obtained output from the NAND element N51 still represent the simulated vehicle speed despite the alternate removal of the L states.

The binary counter BC51 counts the output pulses at 25 kc/s of the oscillator OS51 while the output from the NAND element N51 is in the L state. When the output from the NAND element N51 is in the H state, the binary counter BC51 stops the counting operation, and the results so far counted is memorized in the counter. When the output from the NAND element N51 is changed from the H state to the L state, the output from the monostable multivibrator M51 will be changed from the H state to the L state of a very short duration on and again to the H state.

When the output of the monostable multivibrator M51 becomes L for a short period, the binary counter BC51 is set to the zero state, and the outputs A, B, C, . . . , G, and H thereof are all placed into the H state. On the other hand, the binary down counter BDC51 is always down-counting the output pulses from the 20 KC oscillator OS52.

When the lower frequency output LS from the first discrimination circuit 100 assumes the L state for a short period, the binary down counter BDC51 is set at the zero state and all of the outputs A through I are brought into the H state. When the simulated vehicle speed represented by the duration period of the L state in the output from the NAND element N51 is equal to the rotational speed of the slower wheel represented by the output LS, the duration period of the L state in the output from the NAND element N51 is equal to the time interval between the two succeeding L states in the output LS. When this time interval is assumed to be T (msec), the binary counter BC51 counts $+(25 -P T)$ for this period, and the inputs A1 through A8 of the full adder FA51 and the inputs B1 through B8 of the full adder FA52 will show binary numbers both equal to the $+(25 -T)$.

Since the binary number indicated by the inputs B1 through B8 of the full adder FA51 is equal to $-(20 - T)$ at that time, the sum of the two inputs will be positive, and hence the output SU8 from the full adder FA51 will be in the L state. The binary coded number represented by the inputs A1 through A8 of the full adder FA52 is equal to $-(10 -T)$ which is obtained by dividing the frequency of the oscillator OS52 through the operation of the binary down counter BDC51, whereby the sum of the two kinds of inputs becomes positive, and hence the output SU8 thereof is brought into the L state.

At this instant, if the wheel speed of the slower wheel is equal to 80% of the simulated vehicle speed,
$(1/T) \times 0.8 - 1/T_1$
under the assumption that the duration period of the H state in the output LS is equal to $T_1$. Thus $T_1 = (T/0.8)$.

In this case, the binary coded number represented by the inputs B1 through B8 of the full adder FA51 is equal to $-(20 - T_1) = -(25 - T)$, whereby the sum in the full adder FA51 becomes zero, and the output SU8 thereof assumes the H state. Furthermore, the binary coded number represented by the inputs A1 through A8 in the full adder FA52 will be expressed as $-(10 \times T_1) = -(12.5 - T)$, whereby the sum in the full adder FA52 will be positive, and the output SU8 thereof will also be in the L state.

When the wheel speed of the slower wheel is reduced to 40% of the simulated vehicle speed,
$(1/T) \times 0.4 - (1/T_2), T_2 = (T/0.4)$
wherein $T_2$ is a period between two adjacent L states (or the duration period of a H state interposed therebetween). In this case, the binary coded number represented by the inputs B1 through B8 in the full adder FA51 is equal to $-(20 - T_2) = -(50 - T)$, whereby the sum in the full adder FA51 is negative, and the SU8 output thereof is in the H state. Furthermore, the binary coded number represented by the inputs A1 through A8 in the full adder FA52 is equal to $-(10 - T_2) = -(25 - T)$, whereby the sum in the full adder FA52 becomes zero and the SU8 output is also in the H state.

When the SU8 output of the full adder FA51 is changed from the L state to the H state, the output of the inverter I53 is changed from the H state to the L state, and the reset-set flip-flop RF51 is set. Thus, the $\overline{Q}$ output thereof becomes L, and the Q output from the reset-set flip-flop RF52 becomes H.

Here, when the output of the NAND element N51 is in the L state, the binary counter BC51 is still in the counting operation, and no correct outputs are yet presented, whereby the reset-set flip-flop RF52 is maintained in the preceding state by resetting the flip-flop RF51 thereby to place the Q output in the H state and also changing an input of the NAND element N53 into the L state, thereby rendering the output into the H state. Furthermore, when the SU8 output of the full adder FA51 is not changed from the L state to the H state, if the output LS becomes L under the H output of the NAND element N51, the $\overline{Q}$ output of the reset-set flip-flop RF51 will be maintained in the H state, whereby three inputs of the NAND element N53 will be brought into the H state. Thus, the output thereof will become L, and the reset-set flip-flop RF52 will be reset, and the Q output TQ will be brought into the L state.

In a similar manner, the output WQ, which is the Q output of the reset-set flip-flop RF54, is varied as follows in accordance with the SU8 output of the full adder FA52, the level of the output LS, and the output of the NAND element N51.

1. When the slower wheel speed is greater than 0.8 times the simulated vehicle speed, that is, the slip factor is less than 20%,

| | |
|---|---|
| output TQ | L, and |
| output WQ | L. |

2. When the simulated vehicle speed $\times 0.8 \geq$ the slower wheel speed $>$ the simulated vehicle speed $\times 0.4$, that is, the slip ratio is in a range of from 20 to 60%,

| | |
|---|---|
| output TQ | H, and |
| output WQ | L. |

3. When the simulated vehicle speed $\times 0.4 \geq$ the slower wheel speed, that is, the slip ratio is higher than 60%.

| | |
|---|---|
| output TQ | H |
| output WQ | H |

The operation of the deceleration calculating circuit 500 will now be described with reference to FIG. 16. The output of the oscillator OS61 is counted in the binary counter BC61, whereby the outputs A through G are obtained. The operation will be described for the case of the binary coded operation. The binary counter BC61 can count a number in a range of from 0 to 127. The output of the NAND element N67 is in the H state for an input in a range of from 0 to 119, and the same output is in the L state for an input in a range of from 120 to 127. The output from the terminal "1" of the decoder D61 becomes L when the binary counter counts 121, and it is in the H state for the rest of values such as 0 – 120 and 122 – 127. The output from the terminal "3" of the decoder D61 becomes L only when the output is 123, and likewise the output from the terminal "5" of the decoder D61 becomes L only when the output is 125. Accordingly, the output of the inverter I62 in this case becomes H only when the output is 125. In a similar manner, the output from the terminal "7" of the decoder D61 becomes L only when the output is 127. The operation of this circuit is sequentially controlled by these outputs. The output from the inverter I61 is transferred from L to H for a very short time and then returned to the L state when the input LS is applied thereto.

For a range from 0 to 119 of the output from the binary counter BC61, an input of the NAND element N68 is brought into the H state, whereby the output thereof becomes the input LS itself. The flip-flops F61 through F66 down-count the output LS while the flip-flops F67 through F72 count the output LS.

When 120 is counted in the binary counter BC61, one input of the NAND element N68 becomes L, whereby the output thereof becomes H. The flip-flops F61 through F66 thus hold in themselves a number, for instance, –, and the flip-flops F67 through F72 hold a number, for instance, 40.

When 121 is counted, T inputs of the D type flip-flops DF61 through DF66 are changed from the H state to the L state, and the binary coded number of, for instance, –, which has been held by the Q outputs from the flip-flops F61 through F66, is delivered from the outputs P1 through P6. (When all of the outputs P1 through P6 are in L state, the binary number represented by the outputs is assumed to be zero.)

When 123 is counted, the flip-flops F61 through F66 are all set, and the Q outputs thereof are all brought into the H state. When 125 is counted, those within the flip-flops F67 through F72, which have the Q outputs changed from the H state to the L state, have the $\overline{Q}$ outputs changed from the L state to the H state, and those within the NAND elements N61 through N66 related thereto, which have the two inputs changed into the H state, deliver the output in the L state. Thus, the flip-flops related with the NAND element are reset, and the Q outputs thereof are changed into the L state. If, for instance, the Q output of the flip-flop F69 becomes L, two inputs of the NAND element N63 are changed into the H state, and the output thereof becomes L. The flip-flop F63 is thereby reset, and the Q output thereof is brought into the L state.

As will be apparent from a comparison between the above described two cases, when 123 and 125 are counted, the states of the Q outputs of the flip-flops F67 through F72 are shifted, as they are, into the flip-flops F61 through F66. Accordingly, the binary coded number represented by the states of the Q outputs of the flip-flops F61 through F66 is 40. When 127 is counted, the flip-flops F67 through F72 are all reset, and the Q outputs thereof are placed in the L state; such a condition representing a binary number of zero.

Again in the case where a range of pulses from 0 to 119 is counted in the binary counter BC61, and when 38 pulses of the LS pulses appear in the output of the NAND element N68 by that time, the binary coded number represented by the Q outputs of the flip-flops F61 through F66 is changed successively in a seqence such as 40, 39, 38, ..., 4, 3, and 2. On the other hand, the binary coded number represented by the Q outputs of the flip-flops F67 through F72 is changed as 0, 1, 2, 3, ..., 36, 37, and 38.

When 120 is counted again in the binary counter BC61, the binary coded number represented by the outputs P1 through P6 is held to −2, and the Q outputs of the flip-flops F61 through F66 represent 2. The binary coded number represented by the Q outputs of the flip-flops F67 through F72 on the other hand presents 38. Thus, when 121 is counted, the binary coded number presented by the outputs P1 through P6 becomes 2.

The binary coded number shown by the outputs P1 through P6 indicates the difference between the counted numbers of the LS pulses during the first time interval corresponding to the first counting of the oscillation pulses from 0 to 119 and during the second time interval corresponding to the second counting of the oscillation pulses from 0 to 119.

If the counted number of the LS pulses during the second time interval is less than the counted number of the LS pulses during the first time interval, this indicates that a deceleration has occurred. In the present example, it is so arranged that the difference 1 corresponds to the deceleration of 1G. When 123 and 125 are counted again, the binary coded number 38 is again presented by the Q outputs of the flip-flops F61 through F66.

When 127 is again counted, the binary coded number indicated by the Q outputs of the flip-flops F67 through F72 becomes zero. Thus the decelerations of the slower wheel speed are successively calculated, and an example of the calculated results is shown in the following table.

|  | P1 | P2 | P3 | P4 | P5 | P6 | Ordinary binary code | Full adder binary code |
|---|---|---|---|---|---|---|---|---|
| Deceleration 3G | H | H | L | L | L | L | +3 | +4 |
| Deceleration 2G | L | H | L | L | L | L | +2 | +3 |
| Deceleration 1G | H | L | L | L | L | L | +1 | +2 |
| Deceleration 0 | L | L | L | L | L | L | 0 | +1 |
| Acceleration 1G | H | H | H | H | H | H | −1 | 0 |
| Acceleration 2G | L | H | H | H | H | H | −2 | −1 |
| Acceleration 3G | H | L | H | H | H | H | −3 | −2 |

The operations of the logic circuit 601, D-A conversion circuit 602, and the correction circuit 603 will now be described with reference to FIG. 17A.

1. In the case where the output RQ from the second discrimination circuit 200 is in the H state (which indicates that the output 200 HS is at 200 c/s), and the output $\overline{SQ}$ from the simulated vehicle speed generating circuit 300 is also in the H state (which indicates that the output PV is corresponding to the output 200 HS), the two inputs of the NAND element N81 are in the H state, whereby the output of the NAND element N81 assumes the L state. Since one input of the NAND element N82 is in the L state, the output thereof is in the H state. Furthermore, one input of the NAND element N83 is in the L state, whereby the output thereof is in the H state. Accordingly, two inputs of the NAND element N84 are brought into the H state, and the output K1 of the NAND element N84 assumes the L state. The outputs K2 and K3 of the NAND elements N83 and N82, respectively, are also in the H state.

2. In the case where at least one input of the NAND element N81 is in the L state, and the output of the NAND element N81 is in the H state (for instance, the output PV is not responding to 200 c/s), and a. When slower-wheel speed > simulated vehicle speed × 0.8 (when the slip ratio of the wheel is less than 20%):

Output TQ . . . L and output WQ . . . L

Thus, the outputs of the NAND elements N82 and N83 become H, and two inputs of the NAND element N84 are in the H state. Therefore, the output of the NAND element N84 becomes L, that is, the output K1 becomes L, and the outputs K2 and K3 become H.

b. When the simulated vehicle speed × 0.8 ≧ slower-wheel speed > simulated vehicle speed × 0.4 (the slip ratio of the wheel is in a range of from 20 to 60%):

Output TQ . . . H, and output WQ . . . L

Whereby the output of the NAND element N82 becomes H, thus causing three inputs of the NAND element N83 to be in the H state. The output of the NAND element N83 is thereby brought into L state. Since an input of the NAND element N84 is L, the output K1 is brought into the H state, and the outputs K2 and K3 are placed into the L and H states, respectively.

c. When the simulated vehicle speed × 0.2 ≧ slower-wheel speed (that is, the slip ratio is higher than 60%):

Since the outputs TQ and WQ are both in the H state, two inputs of the NAND element N82 become H, and the output thereof becomes L. Since one input of the NAND element N84 is L, the output thereof becomes H, whereby the outputs K1, K2 become H and the output K3 becomes L.

In the case of the above described case (a), that is, when the output K1 is in the L state (outputs K2 and K3 being in the H state), the outputs of the inverter I81 and the NAND element N85 are L, and the output of the NAND element N86 is H, whereby the inputs A1 through A6 of the full adder FA81 are so changed that the inputs A1 and A2 are changed into L, and the inputs A3, A4, A5, and A6 are changed into H.

The relation between the binary codes and combinations of A1, B1, SU1; A2, B2, SU2; . . . is indicated in the following table.

| Inputs & outputs Binary code | A1 B1 SU1 | A2 B2 SU2 | A3 B3 SU3 | A4 B4 SU4 | A5 B5 SU5 | A6 B6 SU6 |
|---|---|---|---|---|---|---|
| +4 | H | H | L | L | L | L |
| +3 | L | H | L | L | L | L |
| +2 | H | L | L | L | L | L |
| +1 | L | L | L | L | L | L |
| 0 | H | H | H | H | H | H |
| −1 | L | H | H | H | H | H |
| −2 | H | L | H | H | H | H |
| −3 | L | L | H | H | H | H |
| −4 | H | H | L | H | H | H |

When the output K1 is in the L state (the outputs K2 and K3 being in the H state), the binary coded representation of the inputs A1 through A6 of the full adder FA81 is equal to −3.

In the above-mentioned case (b), that is, the output K2 is in the L state (the outputs K1 and K3 being in the H state), the outputs from the inverter I81 and NAND elements N85 and N86 are all brought into the H state, whereby the inputs A1 through A6 of the full adder FA81 represent the binary coded zero.

In the above-mentioned case (c), that is, when the output K3 is in the L state (the outputs K1 and K2 being in the H state), the outputs of the inverter I81 and the NAND element N86 become L, and the output of the NAND element N85 becomes H. Thus the inputs A1, A3, . . . A6 of the full adder FA81 are brought into the L state and the input A2 becomes H, whereby the binary coded representation of the inputs A1 through A6 is +3.

The inputs B1 through B6 of the full adder FA81 are connected to the outputs P1 through P6 of the deceleration calculating circuit 500, respectively, and hence the outputs P1 through P6 are calculated on the basis of the slower-wheel speed. The outputs SU1 through SU6 of the full adder FA81 show the sum of a binary coded number represented by the inputs A1 through A6 and another binary coded number represented by the inputs B1 through B6 of the same full adder FA81, so that the outputs SU1 through SU6 constitute the output of the correction circuit 603.

When, for instance, the output K1 of the logic circuit 601 is in the L state, and the outputs P1 through P6 indicate a deceleration of 2G, the binary coded number indicated by the inputs B1 through B6 of the full adder FA81 is +3, and the binary coded number indicated by the inputs A1 through A6 of the full adder FA81 is −3. Thus, all of the outputs SU1 through SU6 are brought into the H state indicating a binary coded number equal to zero. The zero output of the correction circuit 603 corresponds to an acceleration of 1G.

The relation between the outputs SU1 through SU6 of the full adder FA81 and the corrected deceleration (or acceleration) is indicated in the following table.

The binary coded number represented by the outputs SU1 through SU6 of the full adder FA81 at the time the corrected deceleration is 0G is +1, at which all of the

| Corrected deceleration | SU1 | SU2 | SU3 | SU4 | SU5 | SU6 | Binary coded output of the full adder |
|---|---|---|---|---|---|---|---|
| deceleration 3G | H | H | L | L | L | L | +4 |
| deceleration 2G | L | H | L | L | L | L | +3 |
| deceleration 1G | H | L | L | L | L | L | +2 |
| deceleration 0 | L | L | L | L | L | L | +1 |
| acceleration 1G | H | H | H | H | H | H | ±0 |
| acceleration 2G | L | H | H | H | H | H | −1 |
| acceleration 3G | H | L | H | H | H | H | −2 |
| acceleration 4G | L | L | H | H | H | H | −3 |
| acceleration 5G | H | H | L | H | H | H | −4 | outputs SU1 through SU6 are in the L state. Thus, the output of the inverter I82 becomes H, and this H state is applied to one input of each of the NOR elements NR81 through NR85. The outputs of the NOR elements are thus brought into the L state (the output of the NOR element becomes H only when all the inputs thereof are in the L state. That is, if an input is H, the output of the NOR element becomes L).

Since the state L of the outputs SU1 through SU5 is applied to another input of each of the NAND elements N87 through N91, the outputs of the NAND elements are brought into the H state. Accordingly, the transistors T1, T3, T5, T7, and T9 are caused to conduct and the transistors T2, T4, T6, T8, and T10 are brought into the nonconducting state. Likewise the transistors T11, T12, T13, T14, and T15 assume the non-conducting state. In this state, the capacitor CON1 is not subjected to charging or discharging and when the corrected deceleration is 0G, the output VC of the D-A conversion circuit 602 is rendered into a constant voltage. When the corrected deceleration is 1G, only the output SU1 of the full adder FA81 is changed from L to H, whereby the two inputs of the NAND element N87 are brought into the H state, and the output thereof becomes L. Thus the transistor T1 is brought into the non-conducting state, and the transistor T2 is brought into the conducting state. The capacitor CON1 is thus charged through the resistor R4 and the diode DI1. For this reason, the voltage output VC is built up with a time constant determined by the resistance $16x$ $[\omega]$ and the capacitance of the capacitor CON1.

When the corrected deceleration is 3G, the outputs SU1 through SU6 of the full adder FA81 indicate a binary code of $-4$, wherein the outputs SU1 and SU2 are in the H state and the outputs SU3, SU4, SU5, and SU6 are in the L state. Thus, the NAND elements N87 and N88 are brought into the L state, whereby the transistors T1 and T3 are brought into the nonconductive state, and the transistors T2 and T4 are brought into the conductive state. The capacitor CON1 is then charged through the resistors R4 and R8, and the output voltage VC is built up with a time constant determined by the resistors R4 and R8 and the capacitor CON1.

An equivalent resistance R3G corresponding to the resistors R4 and R8 can be calculated as follows.

$(1/R3G) = (1/16x) + (1/8x)$
$R3G = (16/3) \times [\omega]$

This value is equal to one-third of the resistance value $16x$ $[\omega]$ of the resistor R4. For this reason, the voltage VC is built up at a rate three times higher than in the case of the deceleration equalling 1G. This means that the voltage VC is built up at a rate corresponding to the magnitude of the corrected deceleration.

In the case where a corrected acceleration of 1G is obtained, the outputs SU1 through SU6 of the full adder FA81 expressed in the binary code correspond to $\pm 0$, all of the outputs SU1 through SU6 thus being in the H state. The output of the inverter I82 is thereby brought into the L state, and the outputs of the NAND elements N87 through N91 are brought into the H state because one of the inputs of each of the NAND elements N87 through N91 has been rendered into the L state.

Accordingly, the transistors T1, T3, T5, T7, and T9 are brought into the conductive state, and the transistors T2, T4, T6, T8, and T10 are brought into the non-conductive state. On the other hand, because the outputs SU1 through SU5, each of which constitutes one input of each of the NOR elements NR81 through NR85, are all in the H state, the outputs of the NOR elements NR81 through NR85 are brought into the L state. As a result, the transistors T11, T12, T13, T14, and T15 are brought into the non-conductive state. In this state, the capacitor CON1 is neither charged nor discharged. Thus, the output voltage VC in the case of the corrected acceleration of 1G becomes a constant value as in the case of the corrected deceleration of $\pm 0$ G.

In the case where the corrected acceleration is 2G, the outputs SU1 through SU6 of the full adder FA81 correspond to a binary coded number of $-1$. Thus, only the output SU1 is changed from the H state to the L state in comparison with the outputs for the case where the corrected acceleration is 1G. As a result, two inputs of the NOR element NR81 are in the L state, whereby the output thereof is brought into the H state and the transistor T11 conducts. The charged voltage of the capacitor CON1 is thus discharged through the resistor R22, whereby the voltage VC is reduced with a time constant determined by the resistance $16y$ $[\omega]$ of the resistor R22 and the capacitance of the capacitor CON1.

When the corrected acceleration is 5G, the outputs SU1 through SU6 of the full adder FA81 correspond to a binary coded number of $-4$, and when the outputs are compared with the outputs in the case where the corrected acceleration is 1G, only the output SU3 is changed from the H state to the L state, and the rest of the outputs are all equal in the two cases, whereby two inputs of the NOR element NR83 become L, and the output thereof becomes H. The transistor T13 thus conducts, and the charged voltage in the capacitor CON1 is discharged through the resistor R26. The output voltage VC in this case is reduced with a time constant determined by the resistance $4y$ $[\omega]$ of the resistor R26 and the capacitance of the capacitor CON1. In this case, the rate of reduction of the output voltage VC is four-times higher than the rate in the case where the corrected acceleration is 2G.

As described above, the D-A conversion circuit 602 is operated in such a manner that the output VC thereof is varied in response to the variation in the output RP of the correction circuit 603. That is, when the output RP shows a deceleration, the output VC is made greater in proportion to the magnitude of the deceleration, and when the output RP shows an acceleration, the output VC is reduced in proportion to the magnitude of the acceleration. The output voltage VC is then applied to the servo valve 8.

The operation of the servo valve 8 will now be described with reference to FIG. 18. In the case where the current flowing through the lead wire 23, coil 54, and the lead wire 24 is not sufficient, that is, when the output voltage VC from the D-A conversion circuit 602 is comparatively low, the plunger 60 of the servo valve 8 is in the leftward position as shown in FIG. 18 under the action of the spring 62, whereby the nozzle 59 is closed. The pressurized fluid from the control valve 9 supplied through the conduit 19 and the port 51 is passed through the passage 56 to the chamber 57. On the other hand, the chamber 64 is communicated with the wheel cylinders 3 and 4 through the passages 63 and 52 and a conduit 20, and since the pressure in the wheel cylinders 3 and 4 is lower than the fluid pressure from the control valve 9, the fluid pressure in the chamber 64 is lower than the fluid pressure in the chamber 57. Thus, the spool valve 55 is shifted leftward in FIG. 18, and the passage 51 is communicated with the passage 52.

In the case where the fluid pressure from the control valve 9 is abruptly lowered, the fluid pressure in the chamber 57 does not drop quickly because of the existence of the orifice 58, but the fluid pressure in the chamber 64 is lowered in an earlier period. For this reason, the spool valve is kept in the leftward position, and the passage 51 is communicated with the passage 52.

When a sufficient amount of electric current flows through the coil 54, that is, when the output voltage VC from the D-A conversion circuit 602 is sufficiently high, the plunger 60 is moved rightward against the resilience of the spring 62, whereby the nozzle 59 is opened. Thus, the fluid pressure in the chamber 57 is reduced to an amount determined by the flow resistances in the orifice 58 and the nozzle 59, and the extent of the reduction of the fluid pressure is proportional to the output voltage VC from the D-A conversion circuit 602.

When the fluid pressure in the passage 52 is made higher than the fluid pressure in the chamber 57, the fluid pressure in the chamber 64 becomes higher than that of the chamber 57, whereby the spool valve 55 is moved to the right, and the communication between the passages 51 and 52 is interrupted. The passage 52 is thus communicated with the passage 53, and the fluid pressure in the passage 52 is relieved to the drain through the conduit 14.

In the case where the fluid pressure in the passage 52 is selected to be lower than that of the chamber 57, the fluid pressure in the chamber 64 also becomes lower than that of the chamber 57, whereby the spool valve 55 is moved leftward, and the passage 52 is communicated with the passage 51. Thus, the fluid pressure in the chamber 64 is elevated until it is equalized with that of the chamber 57, and the fluid pressure in the chamber 57 is controlled by the electric current flowing through the coil 54.

The fluid pressure in the wheel cylinders 3 and 4 is thus controlled by the output VC of the D-A conversion circuit 602 in a manner such that the variation of the former is controlled in response to the variation rate of the output VC, and the wheels of the vehicle can be braked in a range of slip ratio of from 20 to 60%, where the adhesive coefficient is comparatively high.

As stated above, in detail, according to the present invention, a vehicle speed is first detected simulatively, the slip ratio of a wheel being calculated from the simulated vehicle speed and the speed of a wheel to be controlled, and when the slip ratio thus calculated is outside of a predetermined slip range, a deceleration or acceleration indicated by the outputs P1 through P6 from the deceleration calculating circuit 500 is corrected in the correction circuit 603, whereby the fluid pressure in the wheel cylinders is controlled in response to the deceleration or acceleration thus corrected so that the wheels can be controlled within the predetermined slip range.

Figure 11A:
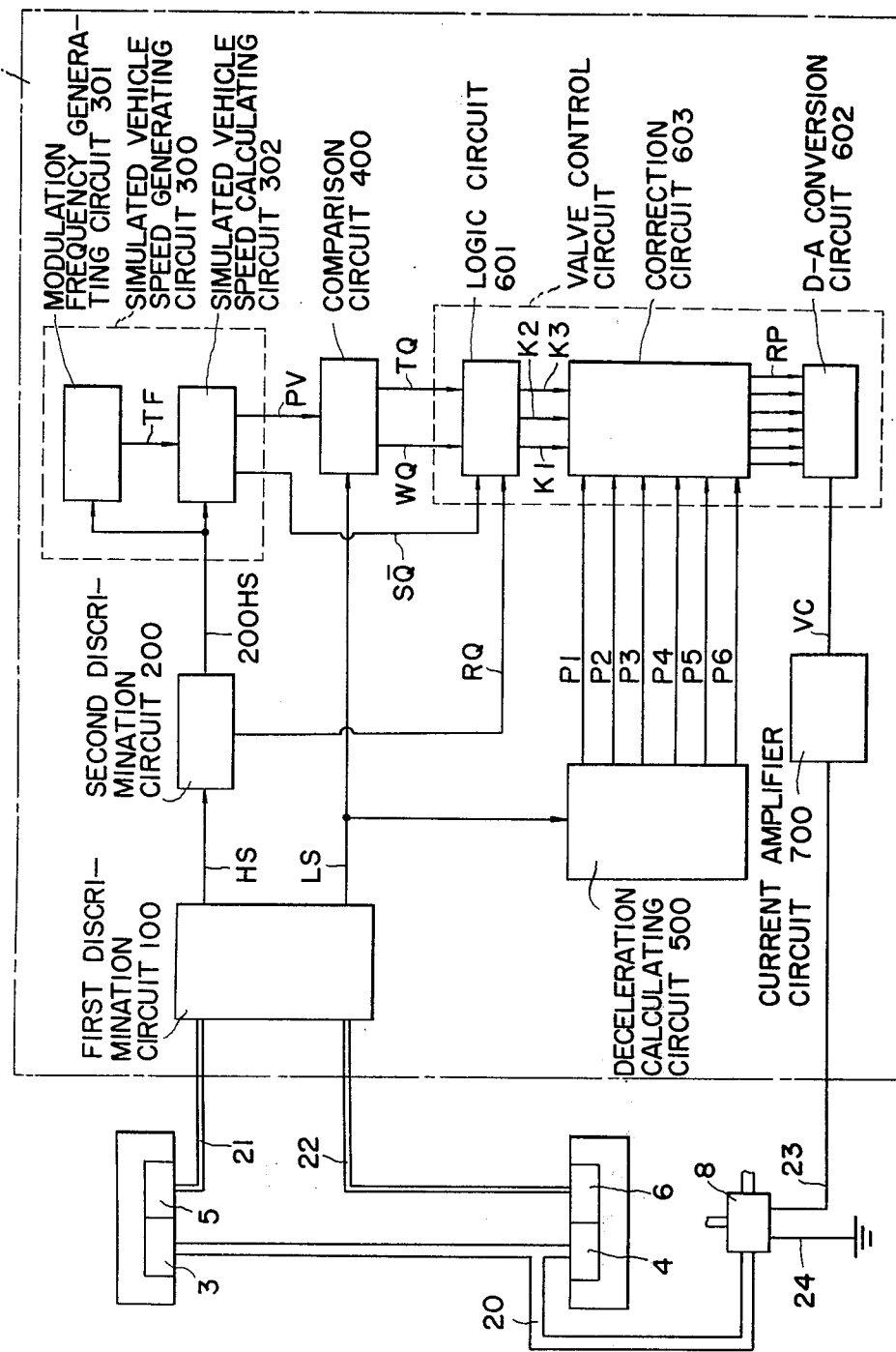
FIG. 11A is a block diagram showing an electric circuit used in the anti-skid brake controlling circuit shown in FIG. 10.
Figure 11B:
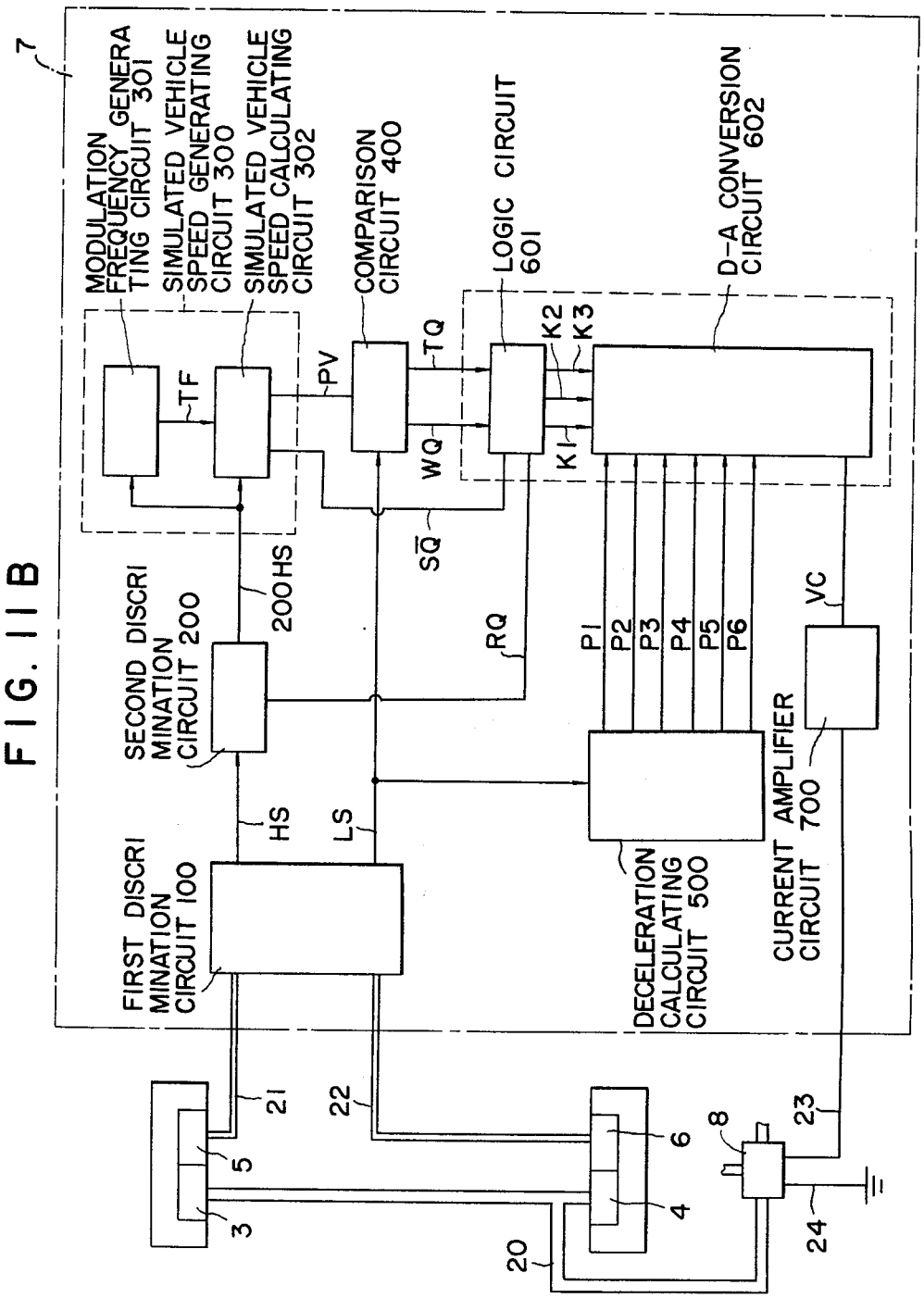
FIG. 11B is a block diagram showing a modified example of the electric circuit shown in FIG. 11A.
Figure 17B:
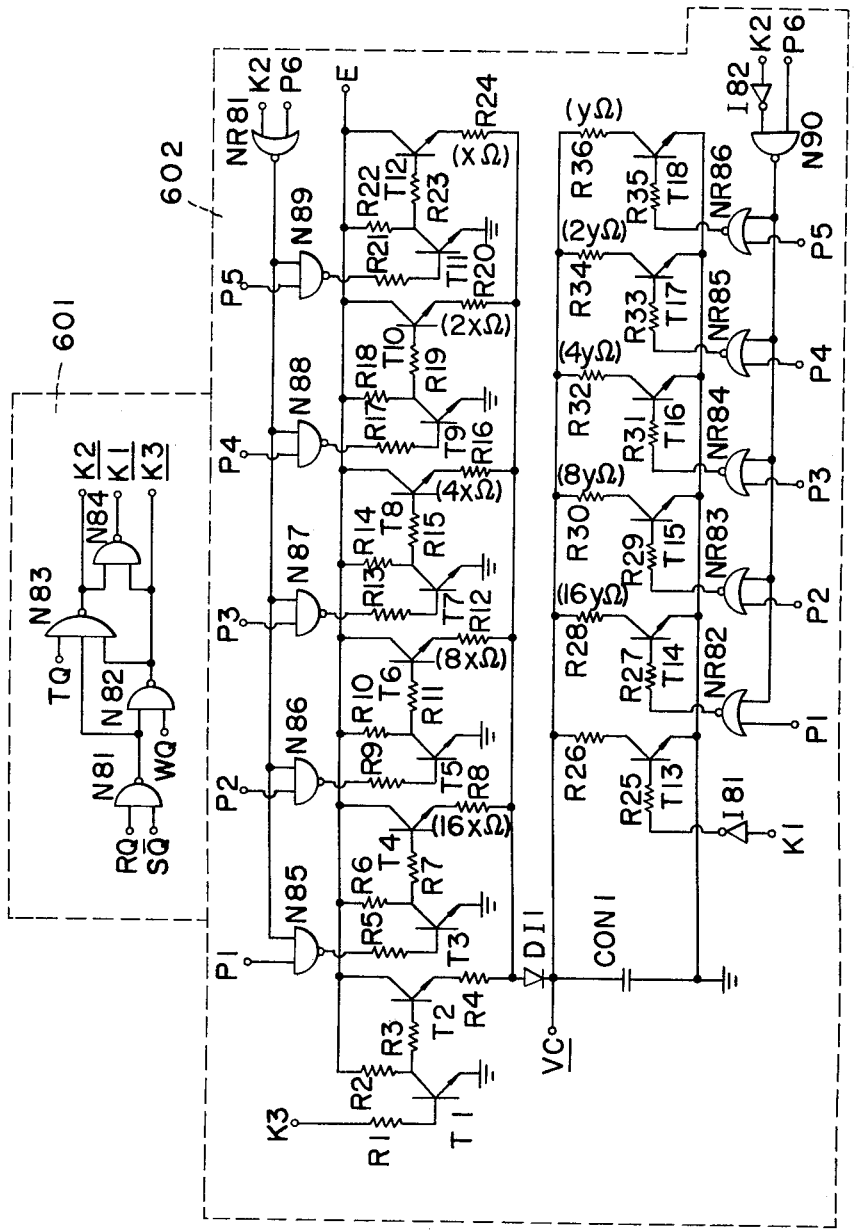
FIG. 17B is a circuit diagram showing other improved circuits also for use in the same device.

The anti-skid brake control system according to the present invention which has been described hereinabove with reference to FIGS. 9, 10, 11A, 12 through 16, 17A, and 18, may be modified by replacing one part of the circuit indicated in FIGS. 11A and 17A by those indicated in FIGS. 11B and 17B. In the improved example, the characteristic relation between the slip ratio of the wheel and the adhesive coefficient of the road surface is also utilized, and the braking forces applied to the wheels are so controlled that the slip ratio of the wheels is in an optimum range of from 20 to 60%.

In the second example of the invention, the deceleration calculating circuit 500 also differentiates the output LS from the first discriminating circuit 100 and thereby delivers the outputs P1, P2, . . . , P6, as described hereinbefore, which represent a binary indicating the deceleration or acceleration actually occurring in the vehicle speed.

In the second example of the invention, the correction circuit 603 is omitted, and the outputs P1 through P6 from the deceleration calculating circuit 500 are directly applied to the D-A conversion circuit 602.

More specifically, the outputs K1, K2, and K2 from the logic circuit 601, as described in the first example of the invention, are introduced in the D-A conversion circuit 602. The D-A conversion circuit 602 delivers the output VC which is varied depending on the logical states of the outputs K1, K2, and K3 and the binary number represented by the outputs P1 through P6.

For instance, when the output K1 is in the L state, the output VC is reduced at a constant rate, and when the output K2 is in the L state and the binary coded number represented by the outputs P1 through P6 is a positive number signifying a deceleration, the output VC is increased at a rate depending on the positive number represented by the outputs P1 through P6. When the output K2 is in the L state and the binary number represented by the outputs P1 through P6 is a negative number signifying an acceleration, the output VC of the D-A convertor 602 is reduced at a rate corresponding to the negative number. When the output K3 is in the L state, the output VC is increased at a constant rate.

In all of the above described cases, the output VC of the D-A conversion circuit 602 is applied to the current amplifier 700 as described in the first example. The output of the current amplifier 700 is applied through the lead wire 23 to the servo valve 8, as described hereinbefore, and the servo valve 8 controls the fluid pressure supplied to the wheel cylinders 3 and 4.

The construction and operation of the combination of the logic circuit 601 and the D-A conversion circuit 602, from which the correction circuit 603 is omitted, will now be described in detail with reference to FIG. 17B.

The logic circuit 601 is composed of NAND elements N81, N82, N83, and N84 as described in the first example of the invention, whereas the construction of the D-A conversion circuit 602 is somewhat different from the same circuit 602 described in the first example.

The D-A conversion circuit 602 in this example comprises inverters I81 and I82, NAND elements N85 through N90, NOR elements NR81 through NR86, resistors R1 through R36, NPN type transistors T1 through T18, a diode DI1, and a capacitor CON1.

The output RQ from the second discrimination circuit 200 and the output SQ̄ from the simulated vehicle speed calculating circuit 302 are applied to the input terminals of the NAND element N81 of the logic circuit 601. The construction of the logic circuit 601 is exactly the same as that of the logic circuit 601 in the first example, and the output K3 from the logic circuit 601 is connected to the base of the transistor T1 through the resistor R1. The collector of the transistor T1 is connected through the resistor R2 to a positive terminal of a power source E the negative terminal (not shown) of which is grounded. The collector of the transistor T1 is further connected through the resistor R3 to the base of the transistor T2. The emitter of the transistor T2 is connected through the resistor R4 to the anode of the diode DI1.

The output K1 of the logic circuit 601 is connected to the input terminal of the inverter I81, and the output thereof is connected through the resistor R25 to the base of the transistor T13. The collector of the transistor T13 is connected through the resistor 26 to the cathode of the diode DI1 and one terminal of the capacitor CON1. The output K2 of the logic circuit 601 is connected to an input of the NOR element NR81 and also to the input of the inverter I82.

The output P1 from the deceleration calculating circuit 500 is applied to an input of the NAND element N85 and an input of the NOR element NR82, and the output P2 of the same circuit 500 is applied to an input of the NAND element N86 and an input of the NOR element NR83. Likewise: the output P3 is connected to the respective inputs of the NAND element N87 and the NOR element NR84; the output P4 is connected to the respective inputs of the NAND element N88 and the NOR element NR85; the output P5 is connected to the respective inputs of the NAND element N89 and the NOR element NR86; and the output P6 is connected to the respective inputs of the NAND element N90 and the NOR element NR81.

The output from the inverter I82 is connected to another input of the NAND element N90, and the output of the NOR element NR81 is connected to each input of the NAND elements N85 through N89.

The output of the NAND element N85 is connected through the resistor R5 to the base of the transistor T3, and the collector of the transistor T3 is connected through the resistor R6 to the power source E and also through the resistor R7 to the base of the transistor T4. The emitter of the transistor T4 is connected through the resistor R8 to the anode of the diode DI1. The output of the NAND element N86 is connected through the resistor R9 to the base of the transistor T5, and the collector of the transistor T5 is connected through the resistor R10 to the power source E and through the resistor R11 to the base of the transistor T6. The emitter of the transistor T6 is connected through the resistor R12 to the anode of the diode DI1.

The output of the NAND element N87 is connected through the resistor R13 to the base of the transistor T7, and the collector of the transistor T7 is connected through the resistor R14 to the power source E and through the resistor R15 to the base of the transistor T8. The emitter of the transistor T8 is connected through the resistor R16 to the anode of the diode DI1.

The output of the NAND element N88 is connected through the resistor R17 to the base of the transistor T9, and the collector of the transistor T9 is connected through the resistor R18 to the power source E and through the resistor R19 to the base of the transistor T10. The emitter of the transistor T10 is connected through the resistor R20 to the anode of the diode DI1.

The output of the NAND element N89 is connected through the resistor R21 to the base of the transistor T11, and the collector of the transistor T11 is connected through the resistor R22 to the power source E and through the resistor R23 to the base of the transistor T12. The emitter of the transistor T12 is connected through the resistor R24 to the anode of the diode DI1. The output of the NOR element NR82 is connected through the resistor R27 to the base of the transistor T14, and the collector of the transistor T14 is connected through the resistor R28 to the cathode of the diode DI1 and to one terminal of the capacitor CON1. The output of the NOR element NR83 is connected through the resistor R29 to the base of the transistor T15, and the collector of the transistor T15 is connected through the resistor R30 to the cathode DI1 and to one terminal of the capacitor CON1. The outputs of the NOR elements NR84, NR85, and NR86 are connected in a similar manner to the bases of the transistors T16, T17, and T18 through resistors R31, R33, and R35, respectively. The collectors of the transistors T16, T17, and T18 are connected through the resistors R32, R34, and R36, respectively, to the junction point between the cathode of the diode DI1 and one terminal of the capacitor CON1. The emitters of the transistors T1 through T18 and the other terminal of the capacitor CON1 are all connected to the ground. Furthermore, the collectors of the transistors T2, T4, T6, T8, T10, and T12 are all connected directly to the power source E.

Here, if the resistance value of the resistor R24 is equal to $x\,[\omega]$, then resistance values of the resistors R20, R16, R12, and R8 can be expressed as $2x$, $4x$, $8x$, and $16x\,[\omega]$. Furthermore, when the resistance value of the resistor R36 is equal to $y\,[\omega]$, then the resistance values of the resistors R34, R32, R30, and R28 can be expressed as $2y$, $4y$, $8y$, and $16y\,[\omega]$. The voltage generated across the capacitor CON1, is the output VC of the D-A conversion circuit 602.

The logic circuit 601 and the D-A conversion circuit 602 of the above described organization operate as follows.

1. When the output RQ from the second discrimination circuit 200 is in the H state (the output 200 HS is of 200 c/s), and the output $\overline{SQ}$ from the simulated vehicle speed generating circuit 300 is also in the H state (the output PV is corresponding to the output 200 HS), the output K1 is in the L state, and the outputs K2 and K3 ar in the H state as described with respect to the first example of this invention.

2. When one or more inputs of the NAND element N81 are in the L state, the output thereof is in the H state (when the output PV does not correspond to 200 c/s).

a. When the speed of the slower wheel $>$ simulated vehicle speed x 0.8 (that is, the slip ratio is less than 20%):

The output K1 becomes L, and the outputs K2 and K3 become H.

b. When the simulated vehicle speed x 0.8 $\geqq$ the slower-wheel speed $>$ simulated vehicle speed x 0.4 (that is, the slip ratio of the wheel is in a range of from 20 to 60%):

The output K1 is in the H state, the output K2 is in the L state, and output K3 is in the H state.

c. When the simulated vehicle speed x 0.4 $\geqq$ slower-wheel speed (that is, the slip ratio is higher than 60%):

The outputs K1 and K2 are in the H state, and the output K3 is in the L state. It should be noted that the slowerwheel corresponds to the controlled wheel described hereinbefore.

In the case of (a), one input of the NOR element NR81 is in the H state, the output thereof is in the L state (when all of the inputs of a NOR element are L, the output of the NOR element becomes H, and when one or more of the inputs are H, the output of the NOR element becomes L).

Accordingly, the outputs of the NAND elements N85 through N89 are in the H state, whereby the transistors T3, T5, T7, T9, and T11 are brought into the conducting state, and the transistors T4, T6, T8, T10, and T12 are brought into the non-conductive state.

On the other hand, the input of the inverter I82 is in the H state, and the output thereof is in the L state. Thus, one input of the NAND element N90 becomes L, and hence the output thereof is brought into the H state. As a result, one input for each of the NOR elements NR82 through NR86 becomes H, and the output thereof becomes L. The transistors T14 through T18 are thus brought into the non-conductive state.

Since the output K3 in this case is in the H state, the transistor T1 conducts, and the transistor T2 is brought into the non-conductive state. The output K1 applied to the input of the inverter I81 is in the L state, causing the output thereof to be in the H state, so that the transistor T13 conducts. In this state, the transistors T2, T4, T6, T8, T10, T12, T14, T15, T16, T17, and T18 are in the non-conductive state, and the transistor T13 is in the conductive state, whereby the output VC generated across the capacitor CON1 is reduced with a time constant determined by the resistor 26 and the capacitor CON1.

In the case (c), that is, when the outputs K1 and K2 are in the H state, and the output K3 is in the L state, one input of the NOR element NR81 is in the H state, whereby the output of the NOR element NR81 is brought into the L state. Thus, one input of each of the NAND elements N85 through N89 becomes L, and hence the outputs of the NAND elements are brought into the H state. The transistors T3, T5, T7, T9, and T11 thus conduct, and the transistors T4, T6, T8, T10, and T12 are brought into the non-conductive state. On the other hand, since the input of the inverter I82 is in the H state, the output thereof becomes L, whereby one input of the NAND element N90 is brought into the L state. The output of the NAND element N90 is thus brought into the H state. Thus, one input of each of the NOR elements NR82 through NR86 is in the H state, whereby the outputs of the NOR elements are brought into the L state, and the transistors T14 through T18 are brought into the non-conductive state.

Since the output K3 is in the L state, the transistor T1 is also brought into the non-conductive state, but the transistor T2 assumes the conductive state. As a result of the input of the inverter I81 being in the H state, the output thereof becomes L, and the transistor T13 is brought into the non-conductive state. Thus the transistors T4, T6, T8, T10, T12, T13, T14, T15, T16, T17, and T18 are in the non-conductive state, and the transistor T2 is in the conductive state. The capacitor CON1 is thus charged from the power source E through the resistor R4 and the diode DI1, so that the output voltage VC across the capacitor CON1 is elevated with a time constant determined by the resistor R4 and the capacitor CON1.

In the case (b), that is when the outputs K1 and K3 are in the H state and the output K2 is in the L state, the transistor T1 conducts, and the transistor T2 is in the non-conductive state; the input of the inverter I81 is in the H state, thereby the output being in the L state, and the transistor T13 is brought into the non-conductive state.

In the case where the outputs P1 through P6 of the deceleration calculating circuit 500 represent a binary coded number showing a deceleration, the output P6 is in the L state. Thus, one input of the NAND element N90 becomes L, and the output of the NAND element N90 is in the H state. One input of each of the NOR elements NR82 through NR86 thus becomes H, whereby the outputs of the NOR elements are brought into the L state, and the transistors T14 through T18 are in the non-conductive state. Two inputs of the NOR element NR81 are now in the L state, and the output thereof is in the H state. Accordingly, the NAND element having an input thereof corresponding to one of the outputs P1 through P5, which is in the H state, and whereby both inputs thereof are in the H state, is brought into the L state. For instance, when a deceleration of 1G is obtained, the output P1 is in the H state, whereby the output from the NAND element N85 is brought into the L state, and the transistor T4 conducts. The capacitor CON1 is thus charged from the power source E through the resistor R8 and the diode DI1, and the voltage VC across the capacitor CON1 is elevated with a time constant determined by the resistance 16x [ω] of the resistor R8 and the capacitance of the capacitor CON1.

When an output indicating a deceleration 3G is obtained, the transistors T4 and T6 conduct, whereby the capacitor CON1 is charged from the power source E through the resistors R8 and R12 and the diode DI1, and the output voltage across the capacitor CON1 is increased with a time constant determined by a resistance equivalent to two resistors R8 and R12 connected in parallel, that is, a resistance $$R_{3G} = \frac{1}{\frac{1}{16x} + \frac{1}{8x}} = \frac{18}{3} = \frac{16x}{3} \quad [\Omega],$$

and the capacitance of the capacitor CON1. This means that the rate of increase of the output voltage VC is three times that in the case of the deceleration 1G. Since the resistance values of the resistors R14, R20, R16, R12, and R8 are selected as described hereinbefore, the increasing rate or reduction rate of the output voltage VC can be adapted to the binary coded number for deceleration represented by the outputs P1 through P6 from the deceleration calculating circuit 500.

When the outputs P1 through P6 from the deceleration calculating circuit 500 indicate a binary coded number representing an acceleration, the output P6 is in the H state, whereby one input of the NOR element NR81 becomes H, and the output from the NOR element NR81 becomes L. Thus, the outputs from the NAND elements N85 through N89 are brought into the H state, and the transistors T4, T6, T8, T10, and T12 are brought into the non-conductive state. On the other hand, two inputs of the NAND element N90 are in the H state, whereby the output of the NAND element N90 becomes L.

When one of the outputs P1 through P5, which is in the L state, is applied to a NOR element, the output of the NOR element becomes H, and a transistor connected to the NOR element is brought into the conductive state. For instance, when an acceleration of 2G is obtained, only the output P1 becomes L and the transistor T14 which is connected to the NOR element NR82 is brought into the conductive state. Thus, the output voltage VC across the capacitor CON1 is reduced in accordance with a time constant determined by the resistance 16y [ω] of the resistor R28 and the capacitance of the capacitor CON1.

When an acceleration of 3G is obtained, only the output P2 is in the L state, and the transistor T15 conducts. Thus the output VC of the D-A conversion circuit 602 is reduced in accordance with a time constant determined by a resistance 8y [ω] of the resistor R30 and the capacitance of the capacitor CON1, and the reduction rate of the output voltage VC is twice the reduction rate of the output voltage in the case where the acceleration is 2G. Since the resistance values of the resistors R36, R34, R32, R30, and R28 are selected as described hereinbefore the reduction rate of the output voltage VC can be adapted to the binary coded number for acceleration represented by the outputs P1 through P6 from the deceleration calculating circuit 500. The output VC from the D-A conversion circuit 602 in the second example of the invention may also be employed for controlling the servo valve 8 as in the first example of the invention which has been hereinbefore described with reference to FIG. 18.

According to the second example of the invention, a vehicle speed is simulatively detected, the slip ratio of the wheels being calculated from the simulated vehicle speed and the speed of the wheels to be controlled, and when the slip ratio thus calculated is within a predetermined range, the fluid pressure to be applied to the braking means is controlled in response to acceleration or deceleration of the wheels. The braking operation of the vehicle is controlled in such a manner that the slip ratio of wheels of the vehicle is within a range wherein the adhesive coefficient of road surface is sufficiently great, whereby the anti-skid braking of the vehicle can be attained easily, and the braking distance can be minimized to an optimum value. Furthermore, the fluid pressure of the braking means is varied in response to the deceleration or acceleration of the vehicle, whereby the fluctuation in the wheel speed can be substantially minimized. Since the calculation circuits in the present invention are composed of logic elements, the reliability of the circuits is substantially improved, and the anti-skid controlling apparatus thus composed is highly suitable for quantity production or mass production.

What is claimed is:

1. An anti-skid control apparatus for an automobile, which comprises:

sensor means adapted to produce outputs corresponding respectively to respective rotating speeds of a plurality of vehicle wheels;

a simulative vehicle speed generating circuit adapted to detect simulatively the wheel speed from the outputs of said sensor means thereby to produce a simulative vehicle signal;

a wheel speed detecting circuit adapted to derive a wheel speed signal of a wheel to be controlled from said outputs of said sensor means;

a deceleration counting circuit adapted to count the decelerated speed of the wheel to be controlled;

a comparing logical circuit adapted to compare said simulative vehicle signal with said wheel speed signal thereby to calculate the slip ratio and to discriminate whether or not said slip ratio is within the range of a predetermined slip of 20 to 60%;

a correcting deceleration circuit adapted to correct the decelerated or accelerated speed obtained in response to the output of said logical circuit, said decelerated or accelerated speed being obtained by a calculating operation of said deceleration counting circuit; and control means for controlling the braking hydraulic pressure of the wheel to be controlled in response to the output of said correcting deceleration circuit when said wheel slip ratio is outside the predetermined range of the slip.

2. A simulative circuit for simulating speed of an automobile under braking, which comprises:

a. a speed detecting circuit adapted to generate an electric wave signal having a frequency corresponding to the rotational speed of the wheels of said automobile;

b. a modulation frequency pulse generating circuit connected at its input side to said speed detecting circuit so as to receive said electric wave signal and adapted to generate a frequency decreasing pulse train once during a first wave part of said electric wave signal, said first wave part having a predetermined potential;

c. a timing pulse generating circuit connected to said electric circuit so as to receive said electric wave signal and adapted to generate a timing pulse train per a predetermined time interval during a second wave part of said electric wave signal, said wave part differing from said first wave part;

d. a pulse conversion circuit comprising two counting circuits for counting separately the abovementioned modulation frequency pulse trains;

an addition circuit for adding the results of said counting circuits, a correction circuit connected to said addition circuit thereby to receive the added result of said addition circuit and adapted to correct only a certain wave part of said electric wave signal in response to said added result, and a control circuit for adding a supplemental correction to the counted result of one of said counting circuits and for memorizing the thus added data;

one of said counting circuits being connected to said modulations frequency pulse generating circuit (b) and said timing pulse generating circuit (c) in such a manner that said one of the counting circuits carries out its counting operation per a certain wave part of said electric wave signal and is reset to zero during the period of time corresponding to the other wave part of said electric wave signal and, said counting operation and resetting being repeated, while the other counting circuit is connected to said modulation frequency pulse generating circuit (a) and said timing pulse generating circuit (c) in such a manner that said other counting circuit carries out once the counting operation in synchronism with the counting operation of said one counting circuit and then carries out correction of said counted result and memorization of the thus corrected result, said memorized result being added to the next counted result of said one counting circuit by means of said addition circuit.

* * * * *